US009065839B2

(12) United States Patent  
Miller

(10) Patent No.: US 9,065,839 B2
(45) Date of Patent: Jun. 23, 2015

(54) MINIMALLY BUFFERED DATA TRANSFERS BETWEEN NODES IN A DATA COMMUNICATIONS NETWORK

(75) Inventor: Douglas R. Miller, Albert Lea, MN (US)

(73) Assignee: International Business Machines Corporation, Armonk, NY (US)

(*) Notice: Subject to any disclaimer, the term of this patent is extended or adjusted under 35 U.S.C. 154(b) by 2306 days.

(21) Appl. No.: 11/865,981

(22) Filed: Oct. 2, 2007

(65) Prior Publication Data

US 2009/0089328 A1 Apr. 2, 2009

(51) Int. Cl.
G06F 15/16 (2006.01)
H04L 29/08 (2006.01)
G06F 9/54 (2006.01)

(52) U.S. Cl.
CPC ............ *H04L 67/1097* (2013.01); *G06F 9/546* (2013.01)

(58) Field of Classification Search
CPC ..................................... G06F 9/546
USPC ......................................... 709/232
See application file for complete search history.

(56) References Cited

U.S. PATENT DOCUMENTS

| 4,860,201 | A | 8/1989 | Stolfo et al. |
| 4,910,669 | A | 3/1990 | Gorin et al. |
| 5,050,162 | A | 9/1991 | Golestani |
| 5,063,562 | A | 11/1991 | Barzilai et al. |
| 5,095,444 | A | 3/1992 | Motles |
| 5,218,676 | A | 6/1993 | Ben-Ayed et al. |
| 5,347,450 | A | 9/1994 | Nugent |
| 5,414,839 | A | 5/1995 | Joshi |
| 5,491,691 | A | 2/1996 | Shtayer et al. |
| 5,651,099 | A | 7/1997 | Konsella |
| 5,815,793 | A | 9/1998 | Ferguson |
| 5,826,262 | A | 10/1998 | Bui et al. |
| 5,826,265 | A | 10/1998 | Van Huben et al. |
| 5,835,482 | A | 11/1998 | Allen |
| 5,859,981 | A | 1/1999 | Levin et al. |
| 5,862,381 | A | 1/1999 | Advani et al. |
| 5,875,190 | A | 2/1999 | Law |
| 5,912,893 | A | 6/1999 | Rolfe et al. |

(Continued)

OTHER PUBLICATIONS

"MPI-2: Extensions to the Message-Passing Interface," Message Passing Interface Forum, Nov. 15, 2003.*

(Continued)

*Primary Examiner* — Andrew Georgandellis
(74) *Attorney, Agent, or Firm* — Biggers Kennedy Lenart Spraggins, LLP

(57) ABSTRACT

Methods, apparatus, and products for minimally buffered data transfers between nodes in a data communications network are disclosed that include: receiving, by a messaging module on an origin node, a storage identifier, a origin data type, and a target data type, the storage identifier specifying application storage containing data, the origin data type describing a data subset contained in the origin application storage, the target data type describing an arrangement of the data subset in application storage on a target node; creating, by the messaging module, origin metadata describing the origin data type; selecting, by the messaging module from the origin application storage in dependence upon the origin metadata and the storage identifier, the data subset; and transmitting, by the messaging module to the target node, the selected data subset for storing in the target application storage in dependence upon the target data type without temporarily buffering the data subset.

18 Claims, 9 Drawing Sheets

(56) References Cited

U.S. PATENT DOCUMENTS

| | | | |
|---|---|---|---|
| 5,918,020 A | 6/1999 | Blackard et al. | |
| 5,933,425 A | 8/1999 | Iwata | |
| 5,937,201 A | 8/1999 | Matsushita et al. | |
| 5,953,336 A | 9/1999 | Moore et al. | |
| 5,982,771 A | 11/1999 | Caldara et al. | |
| 5,995,503 A | 11/1999 | Crawley et al. | |
| 5,999,734 A | 12/1999 | Willis et al. | |
| 6,006,032 A | 12/1999 | Blandy et al. | |
| 6,047,122 A | 4/2000 | Spiller | |
| 6,057,839 A | 5/2000 | Advani et al. | |
| 6,101,495 A | 8/2000 | Tsuchida et al. | |
| 6,115,357 A | 9/2000 | Packer et al. | |
| 6,118,777 A | 9/2000 | Sylvain | |
| 6,126,331 A | 10/2000 | Komatsu et al. | |
| 6,167,490 A | 12/2000 | Levy et al. | |
| 6,182,183 B1 | 1/2001 | Wingard et al. | |
| 6,253,372 B1 | 6/2001 | Komatsu et al. | |
| 6,336,143 B1 | 1/2002 | Diedrich et al. | |
| 6,343,339 B1 | 1/2002 | Daynes | |
| 6,438,702 B1 | 8/2002 | Hodge | |
| 6,490,566 B1 | 12/2002 | Schmidt | |
| 6,493,637 B1 | 12/2002 | Steeg | |
| 6,563,823 B1 | 5/2003 | Przygienda et al. | |
| 6,600,721 B2 | 7/2003 | Edholm | |
| 6,601,098 B1 | 7/2003 | Case et al. | |
| 6,633,937 B2 | 10/2003 | Thomson | |
| 6,687,247 B1 | 2/2004 | Wilford et al. | |
| 6,725,313 B1 | 4/2004 | Wingard et al. | |
| 6,742,044 B1 | 5/2004 | Aviani et al. | |
| 6,748,413 B1 | 6/2004 | Bournas | |
| 6,772,255 B2 | 8/2004 | Daynes | |
| 6,775,703 B1 | 8/2004 | Burns et al. | |
| 6,836,480 B2 | 12/2004 | Basso et al. | |
| 6,839,768 B2 | 1/2005 | Ma et al. | |
| 6,839,829 B1 | 1/2005 | Daruwalla et al. | |
| 6,894,974 B1 | 5/2005 | Aweya et al. | |
| 6,901,052 B2 | 5/2005 | Buskirk et al. | |
| 6,952,692 B1 | 10/2005 | Bhattiprolu et al. | |
| 6,990,529 B2 | 1/2006 | Yang et al. | |
| 7,032,224 B2 * | 4/2006 | Kadakia et al. | 719/313 |
| 7,120,712 B2 | 10/2006 | Wingard et al. | |
| 7,197,577 B2 | 3/2007 | Nellitheertha | |
| 7,216,217 B2 | 5/2007 | Hansen et al. | |
| 7,286,471 B2 | 10/2007 | Kloth et al. | |
| 7,299,155 B2 | 11/2007 | Ebert et al. | |
| 7,301,541 B2 | 11/2007 | Hansen et al. | |
| 7,458,077 B2 | 11/2008 | Duke | |
| 7,466,652 B2 | 12/2008 | Lau et al. | |
| 7,478,138 B2 | 1/2009 | Chang et al. | |
| 7,480,298 B2 | 1/2009 | Blackmore et al. | |
| 7,480,609 B1 | 1/2009 | Cavanagh et al. | |
| 7,509,244 B1 | 3/2009 | Shakeri et al. | |
| 7,527,558 B2 | 5/2009 | Lavoie et al. | |
| 7,539,209 B2 | 5/2009 | Pelley | |
| 7,647,441 B2 | 1/2010 | Wingard et al. | |
| 7,673,011 B2 | 3/2010 | Archer et al. | |
| 7,684,332 B2 | 3/2010 | Ray et al. | |
| 7,738,443 B2 | 6/2010 | Kumar | |
| 7,743,382 B2 | 6/2010 | Schumacher et al. | |
| 7,813,369 B2 | 10/2010 | Blackmore et al. | |
| 7,913,369 B2 | 3/2011 | Gakovic | |
| 7,953,085 B2 | 5/2011 | Chang et al. | |
| 7,958,183 B2 | 6/2011 | Arimilli et al. | |
| 8,041,969 B2 | 10/2011 | Archer et al. | |
| 8,055,879 B2 | 11/2011 | Archer et al. | |
| 8,087,025 B1 | 12/2011 | Graupner | |
| 8,195,152 B1 | 6/2012 | Edwards | |
| 2001/0047458 A1 | 11/2001 | Iizuka | |
| 2002/0065930 A1 | 5/2002 | Rhodes | |
| 2002/0194392 A1 | 12/2002 | Cheng et al. | |
| 2003/0004699 A1 | 1/2003 | Choi et al. | |
| 2003/0021287 A1 | 1/2003 | Lee et al. | |
| 2003/0074142 A1 | 4/2003 | Steeg | |
| 2003/0093254 A1 | 5/2003 | Frankel et al. | |
| 2003/0093255 A1 | 5/2003 | Freyensee et al. | |
| 2004/0001508 A1 | 1/2004 | Zheng et al. | |
| 2004/0015494 A1 | 1/2004 | Basso et al. | |
| 2004/0098373 A1 | 5/2004 | Bayliss et al. | |
| 2004/0107240 A1 | 6/2004 | Zabarski et al. | |
| 2004/0111398 A1 | 6/2004 | England et al. | |
| 2004/0246897 A1 | 12/2004 | Ma et al. | |
| 2004/0255002 A1 | 12/2004 | Kota et al. | |
| 2005/0053034 A1 | 3/2005 | Chiueh | |
| 2005/0060462 A1 | 3/2005 | Ota | |
| 2005/0138161 A1 | 6/2005 | McDaniel et al. | |
| 2005/0182834 A1 | 8/2005 | Black | |
| 2005/0278453 A1 | 12/2005 | Cherkasova | |
| 2006/0002424 A1 | 1/2006 | Gadde | |
| 2006/0018283 A1 | 1/2006 | Lewis et al. | |
| 2006/0059196 A1 | 3/2006 | Sato et al. | |
| 2006/0075067 A1 | 4/2006 | Blackmore et al. | |
| 2006/0107262 A1 | 5/2006 | Bodas et al. | |
| 2006/0203739 A1 | 9/2006 | Padmanabhan et al. | |
| 2006/0292292 A1 | 12/2006 | Brightman et al. | |
| 2007/0014316 A1 | 1/2007 | Ryu et al. | |
| 2007/0016589 A1 | 1/2007 | Hara et al. | |
| 2007/0094429 A1 | 4/2007 | Wingard et al. | |
| 2007/0121511 A1 | 5/2007 | Morandin | |
| 2007/0179760 A1 | 8/2007 | Smith | |
| 2007/0260746 A1 | 11/2007 | Mirtorabi et al. | |
| 2007/0294426 A1 | 12/2007 | Huang et al. | |
| 2008/0016249 A1 | 1/2008 | Ellis et al. | |
| 2008/0109569 A1 | 5/2008 | Leonard et al. | |
| 2008/0126739 A1 | 5/2008 | Archer et al. | |
| 2008/0148355 A1 | 6/2008 | Archer et al. | |
| 2008/0168177 A1 | 7/2008 | Subramaniam | |
| 2008/0240115 A1 | 10/2008 | Briscoe et al. | |
| 2008/0306721 A1 | 12/2008 | Yang | |
| 2008/0310350 A1 | 12/2008 | Dykema et al. | |
| 2008/0313376 A1 | 12/2008 | Archer et al. | |
| 2008/0313661 A1 | 12/2008 | Blocksome et al. | |
| 2009/0003344 A1 | 1/2009 | Kumar | |
| 2009/0006808 A1 | 1/2009 | Blumrich et al. | |
| 2009/0006810 A1 | 1/2009 | Almasi et al. | |
| 2009/0025604 A1 | 1/2009 | Deroover et al. | |
| 2009/0037707 A1 | 2/2009 | Blocksome | |
| 2009/0043988 A1 | 2/2009 | Archer et al. | |
| 2009/0067334 A1 | 3/2009 | Archer et al. | |
| 2009/0089328 A1 | 4/2009 | Miller | |
| 2009/0092075 A1 | 4/2009 | Corson et al. | |
| 2009/0113308 A1 | 4/2009 | Almasi et al. | |
| 2009/0125604 A1 | 5/2009 | Chang et al. | |
| 2009/0129277 A1 | 5/2009 | Supalov et al. | |
| 2009/0138892 A1 | 5/2009 | Almasi et al. | |
| 2009/0196282 A1 | 8/2009 | Fellman et al. | |
| 2009/0201832 A1 | 8/2009 | Brown | |
| 2009/0300154 A1 | 12/2009 | Branson et al. | |
| 2010/0005189 A1 | 1/2010 | Archer et al. | |
| 2010/0017492 A1 | 1/2010 | Reistad | |
| 2010/0023631 A1 | 1/2010 | Archer et al. | |
| 2010/0037035 A1 | 2/2010 | Archer et al. | |
| 2010/0058313 A1 | 3/2010 | Hansmann et al. | |
| 2010/0241774 A1 | 9/2010 | Olszewski et al. | |
| 2010/0274872 A1 | 10/2010 | Harrang et al. | |
| 2010/0287320 A1 | 11/2010 | Querol et al. | |
| 2011/0113083 A1 | 5/2011 | Shahar | |
| 2011/0238949 A1 | 9/2011 | Archer et al. | |
| 2011/0258627 A1 | 10/2011 | Faraj et al. | |
| 2012/0030370 A1 | 2/2012 | Faraj et al. | |
| 2012/0174105 A1 | 7/2012 | Archer et al. | |
| 2012/0185230 A1 | 7/2012 | Archer et al. | |
| 2012/0185867 A1 | 7/2012 | Archer et al. | |
| 2012/0185873 A1 | 7/2012 | Archer et al. | |
| 2012/0210094 A1 | 8/2012 | Blocksome et al. | |
| 2012/0246256 A1 | 9/2012 | Blocksome et al. | |
| 2013/0024866 A1 | 1/2013 | Archer et al. | |
| 2013/0046844 A1 | 2/2013 | Faraj et al. | |
| 2013/0060557 A1 | 3/2013 | Archer et al. | |
| 2013/0060833 A1 | 3/2013 | Archer et al. | |
| 2013/0061238 A1 | 3/2013 | Archer et al. | |
| 2013/0067479 A1 | 3/2013 | Archer et al. | |
| 2013/0067483 A1 | 3/2013 | Archer et al. | |
| 2013/0067487 A1 | 3/2013 | Faraj et al. | |
| 2013/0111482 A1 | 5/2013 | Archer et al. | |

(56) References Cited

U.S. PATENT DOCUMENTS

2013/0124665 A1  5/2013  Blocksome et al.
2013/0160025 A1  6/2013  Faraj et al.
2013/0179620 A1  7/2013  Faraj et al.

OTHER PUBLICATIONS

"MPI Performance Topics.".*
"Message Buffering and its Effet on the Communication Performance of Parallel computers.".*
"Derived Datatypes with MPI.".*
Office Action, U.S. Appl. No. 11/832.192, Oct. 29, 2010.
Bershad et al. Spin—An Extensible Microkernel for Application-Specific Operating System Services. ACM SIGOPS Operating System Review. vol. 29, Issue 1 (Jan. 1995). pp. 74-77.
Bershad et al. Spin—An Extensible Microkernel for Application-Specific Operating System Services. Technical Report 94-03-03 (Feb. 28, 1994). pp. 1-16. [Retrieved from: http://www-spin.cs.washington.edu/papers/index.html on Nov. 23, 2009].
Hollingworth, D.: Redmond, T.; Rice, R. Security Policy Realization in an Extensible Operating System. Proceedings of DARPA Information Survivability Conference and Exposition. DISCEX '00 (Jan. 25-27, 2000). vol. 1. pp. 320-334.
"Windows Native Processor Performance Control", Windows Platform Design Notes—Designing Hardware for the Microsoft Windows Family of Operating Systems, Nov. 12, 2002.
Office Action Dated Dec. 10, 2009 in U.S. Appl. No. 11/553,040.
Office Action Dated Oct. 3, 2008 in U.S. Appl. No. 11/531,846.
Final Office Action Dated Mar. 2, 2009 in U.S. Appl. No. 11/531,846.
Office Action Dated Jul. 31, 2009 in U.S. Appl. No. 11/531,846.
Office Action Dated Apr. 29, 2009 in U.S. Appl. No. 11/764,282.
Final Office Action Dated Dec. 8, 2009 in U.S. Appl. No. 11/764,282.
Notice of Allowance Dated Oct. 13, 2009 in U.S. Appl. No. 11/837,015.
Chan, Ernie et al. "Collective Communication on Architectures that Support Simultaneous Communication over Multiple Links", PPoPP'06, Mar. 29-31, 2006, New York, New York, USA, pp. 2-11.
Mao, Weizhen et al. "One-To-All Personalized Communication in Torus Networks", Proceedings of the $25^{th}$ IASTED International Multi-Conference: parallel and distributed computing networks, Innsbruck, Austria, 2007, pp. 291-296.
Almasi, George et al. "Optimization of MPI Collective Communication on BlueGene/L Systems", ICS'05, Jun. 20-22, 2005, Boston, MA, USA, 2005, pp. 253-262.
Moreira, et al.; The Blue Gene/L Supercomputer: A Hardware and Software Story; International Journal of Parallel Programming; Jun. 2007; pp. 181-206; vol. 35, No. 3, Springer Science+Business Media LLC.; USA.
Notice of Allowance Dated Apr. 6, 2010 in U.S. Appl. No. 11/531,846.
Final Office Action Dated Apr. 29, 2010 in U.S. Appl. No. 11/553,040.
Office Action Dated Jul. 12, 2010 in U.S. Appl. No. 11/764,282.
Office Action Dated May 3, 2010 in U.S. Appl. No. 12/180,963.
Nenad Stankovic Kang Zhang, Visual Programming for Message-Passing Systems (1999), International Journal of Software Engineering and Knowledge Engineering.
Matthew J. Sottile, Vaddadi P. Chandu, David A. Bader, Performance analysis of parallel programs via message-passing graph traversal, College of Computing, Georgia Institute of Technology, Feb. 25, 2006.
"MPI-2: Extensions to the Message-Passing Interface," Forum, Nov. 15, 2003.
Office Action, U.S. Appl. No. 11/946,934, Nov. 24, 2010.
Office Action, U.S. Appl. No. 11/924,934, Aug. 19, 2010.
Notice of Allowance, U.S. Appl. No. 11/764,282, Dec. 10, 2010.
Office Action, U.S. Appl. No. 11/832,192, Oct. 29, 2010.
Office Action, U.S. Appl. No. 12/166,748, May 27, 2010.
Office Action, U.S. Appl. No. 12/166,748, Aug. 25, 2010.
Notice of Allowance, U.S. Appl. No. 12/180,963, Oct. 20, 2010.
Final Office Action, U.S. Appl. No. 12/166,748, Mar. 7, 2011.
Final Office Action, U.S. Appl. No. 11/832,192, Apr. 13, 2011.
Office Action, U.S. Appl. No. 11/764,333, Apr. 13, 2011.
Final Office Action, U.S. Appl. No. 11/924,934, Feb. 24, 2011.
Notice of Allowance, U.S. Appl. No. 11/946,136, Mar. 4, 2011.
Office Action, U.S. Appl. No. 11/865,921, Feb. 2, 2011.
Willis, "MinSim: Optimized, Compiled VHDL Simulation Using Networked & Parallel Computers", 1993, Proceedings of Fall 1993 VHDL International User's Forumn, pp. 197-144.
Final Office Action, U.S. Appl. No. 11/924,934, Jan. 6, 2012.
Advisory Action, U.S. Appl. No. 11/865,981, Oct. 14, 2011.
Advisory Action, U.S. Appl. No. 11/764,333, Nov. 28, 2011.
Notice of Allowance, U.S. Appl. No. 11/832,192, Aug. 11, 2011.
Office Action, U.S. Appl. No. 12/189,336, Dec. 9, 2011.
Notice of Allowance, U.S. Appl. No. 12/189,336, Mar. 27, 2013.
Office Action, U.S. Appl. No. 13/006,696, Mar. 4, 2013.
Final Office Action, U.S. Appl. No. 13/007,905, Apr. 17, 2013.
Final Office Action, U.S. Appl. No. 12/985,075, Apr. 18, 2013.
Final Office Action, U.S. Appl. No. 13/667,456, Apr. 19, 2013.
Huang et al., "DZM: MPI One-Sided Exploitation of LAIP API's Component Design, Communication Protocols & Application Tools Development", Jun. 6, 2006, pp. 1-70, IBM Corporation, Poughkeepsie, NY.
Tanenbaum, Andrew S., "Structured Computer Organization", 1984, Prentice-Hall, $2^{nd}$ Edition, pp. 10-12.
Final Office Action, U.S. Appl. No. 11/764,333, Sep. 2, 2011.
Office Action, U.S. Appl. No. 12/135,604, Nov. 4, 2011.
Notice of Allowance, U.S. Appl. No. 12/166,748, Nov. 9, 2011.
Blaise Barney, "Message Passing Interface (MPA)", Jul. 21, 2011, Lawrence Livermore National Laboratory, <http://web.archive.org/web/20110721045616/https://computing.llnl.gov/tutorials/mpl/>.
"DeinoMPI—MPI_Comm_split", May 11, 2011, Deino Software, <http://web.archive.org/web/20110501135905?http://mpi.deino.net/mpi_functions/MPI_Comm_split.html>.
Office Action, U.S. Appl. No. 13/185,856, May 23, 2013, pp. 1-14.
Final Office Action, U.S. Appl. No. 12/748,579, May 10, 2013, pp. 1-7.
Notice of Allowance, U.S. Appl. No. 12/985,075, Jun. 12, 2013, pp. 1-14.
Office Action, U.S. Appl. No. 13/231,326, Jun. 6, 2013, pp. 1-57.
Office Action, U.S. Appl. No. 13/690,474, Jun. 25, 2013.
University of Minnesota Super Computing Institute. 2009. Derived Data Types with MPI.
William Saphir, Message Buffering and It's Effect on the Communications Performance on Parallel Computers. Apr. 1994.
University of Minnesota Super Computing Institute. 2009 MPI Performance Topics.
Final Office Action, U.S. Appl. No. 11/865,981, Jul. 22, 2011.
Gropp1, "Tutorial on MPI: The Message-Passing Interface", Argonne National Laboratory, Apr. 23, 2009, URL: https://web.archive.org/web/20090423041649/http://www.mcs.anl.gov/research/projects/mpi/tutorial/gropp/node82.html.
Gropp2, "Tutorial on MPI: The Message-Passing Interface", Argonne National Laboratory, Apr. 23 2009, URL: https://web.archive.org/web/20090423035309/http://www.mcs.anl.gov/research/projects/mpi/tutorial/g ropp/node81.html.
Weed, "Message Passing Programming with MPI-Overview and Function Description", Mississippi State University, Jul. 1999, 124 pages.
"MPI-2: Extensions to the Message-Passing Interface," Message Passing Interface Forum, Nov. 15, 2003, http://moi-forum.cs.uiuc.edu/docs/mpi2-report.pdf, Accessed Nov. 7, 2013, 370 pages.
"MPI Performance Topics", https://computing.llnl.gov/tutorials/mpi_performance/, Accessed Jul. 8, 2011, 20 Pages.
Saphir, W., "Message Buffering and its Effect on the Communication Performance of Parallel Computers", Apr. 1994, http://citeseerx.ist.psu.edu/viewdoc/download?doi=1  0.1.1.128.5359&rep1&type=pdf, pp. 1-20.
"Derived Datatypes with MPI", http://static.msi.umn.edu/tutorial/scicomp/general/MPI/content6,html, Accessed Jul. 11, 2011, 10 Pages.
Willis, J., et al., "MinSim: Optimized, Compiled VHDL Simulation Using Networked & Parallel Computers", Proceedings of Fall 1993

(56) References Cited

OTHER PUBLICATIONS

VHDL International User's Forum, Fall 1993, http://www.eda.org/VIUF_proc/Fall93/abstract_fall93.html#WILLIS93A, Accessed Nov. 7, 2013, pp. 137-144.

Almasi, G., et al. "Optimization of MPICollective Communication on BlueGene/L Systems", ICS'05, Jun. 20-22, 2005, pp. 253-262, ACM, Boston, MA, USA.

Chan, E., et al. "Collective Communication on Architectures that Support Simultaneous Communication over Multiple links", PPoPP'06, Mar. 29-31, 2006, pp. 2-11, ACM, New York, New York, USA.

Huang, S., et al. "DZB: MPI One-sided Exploitation of LAPI APIs Component Design", Communication Protocols & Application Tools Development, Mar. 16, 2006, pp. 1-70, IBM Corporation Poughkeepsie, NY, USA.

Weizhen, M. et al., "One-To-All Personalized Communication in Torus Networks", PDCn'07 Proceedings of the 25th IASTED International Multi-Conference: parallel and distributed computing and networks, Innsbruck, Austria, Year: 2007 (Month Unknown), pp. 291-296, Acta Press Anaheim, CA, USA.

Sottile, M., et al., "Performance analysis of parallel programs via message-passing graph traversal", Feb. 25, 2006, Proc. 20th IEEE Inn Parallel and Distributed Processing Symp. (IPDPS), Conference Date: Apr. 25-29, 2006, pp. 1-29, Los Alamos Nat. Lab., NM, USA. URL: https://smartech.gatech.edu/bitstream/handle/1853/14424/GT-CSE-06-10.pdf.

Stankovic, N., et al., "Visual Programming for Message-Passing Systems", International Journal of Software Engineering and Knowledge Engineering, (1999), (Month Unknown), 25 Pages, vol. 9, URL: http://citeseerx.ist.psu.edu/viewdoc/summary?doi=10.1.1.18.4673.

"DeinoMPI—MPI_Comm_split, May 11, 2011, Deino Software," http://web.archive.org/web/20110501135905/http://mpi.deino.net/mpi_functions/MP1_Comm_split.html, Accessed May 30, 2013, 4 Pages.

Barney, B., "Message Passing Interface (MPI)", Jul. 21, 2011, Lawrence Livermore National Laboratory http://web.archive.org/web/20110721045616/https://computing.llnl.gov/tutorial/mpi/, Accessed Nov. 7, 2013, 31 Pages.

Faraj, A., et al., "STAR-MPI: Self Tuned Adaptive Routines for MPI Collective Operations", Proceedings of the 20th Annual International Conference on Supercomputing (ICS'06), Jun. 2006, pp. 199-208, ACM, New York, New York, USA.

Ribler, R., et al., "The Autopilot performance-directed adaptive control system," Future Generations Computer Systems, Sep. 1, 2001, pp. 175-187, vol. 18, No. 1, Elsevier Science Publications, Amsterdam, NL.

Zhang, Y., et al., "Automatic Performance Tuning for J2EE Application Server Systems," Lecture Notes in Computer Science, Year: 2005, (Month Unknown), pp. 520-527, vol. 3806, Springer Berlin Heidelberg.

Chung, I-Hsin, et al., "Automated Cluster-Based Web Service Performance Tuning," Proceedings of the 13th IEEE International Symposium on High Performance Distributed Computing, 2004, Honolulu, HI, USA, Jun. 4-6, 2004, pp. 36-44, Piscataway, NJ, USA.

Hondroudakis, A., et al., "An Empirically Derived Framework for Classifying Parallel Program Performance Tuning Problems," Proceedings of the Sigmetrics Symposium on Parallel and Distributed Tools, SPOT 1998, Welches, OR, Aug. 3-4, 1998. Sigmetrics Symposium on Parallel and Distributed Tools, Aug. 3, 1998, pp. 112-123, vol. Symp 2, New York, NY, US, ACM.

Gara, A., et al., "Overview of the Blue Gene/L System Architecture," IBM Journal of Research & Development, Mar./May 2005, pp. 195-211, vol. 49, No. 2/3, IBM, New York, USA.

Adiga, N. R., et al., "Blue Gene/L Torus Interconnection Network." IBM Journal of Research & Development, Mar./May 2005, pp. 265-276, vol. 49, No. 2/3, IBM, New York, USA.

Barnett, M. et al., "Broadcasting on Meshes With Worm-Hole Routing," Second Revised Version, Dec. 1995, pp. 1-22, University of Texas, Department of Computer Sciences.

Faraj, A., et al. "MPI Collective Communications on the Blue Gene/P Supercomputer: Algorithms and Optimizations", 17th IEEE Symposium on High Performance Interconnects, New York, NY, Aug. 25-27, 2009, pp. 63-72, IEEE.

Faraj, A., et al. "A Study of Process Arrival Patterns for MPI Collective Operations", International Journal of Parallel Programming, Jan. 10, 2008, pp. 1-28, Springer (Online).

Faraj, A., et al. "Automatic Generation and Tuning of MPI Collective Communication Routines", ICS'05, Jun. 20-22, 2005, pp. 393-402, Boston, MA, USA. ACM.

U.S. Appl. No. 8/087,025, filed Dec. 2011, Graupner, Sven.

Office Action, U.S. Appl. No. 12/189,336, Sep. 13, 2012.

Office Action, U.S. Appl. No. 12/748,579, Sep. 19, 2012.

Notice of Allowance, U.S. Appl. No. 12/847,573, Jan. 11, 2012.

Office Action, U.S. Appl. No. 13/007,905, Dec. 28, 2012.

Office Action, U.S. Appl. No. 12/985,075, Nov. 7, 2012.

Office Action, U.S. Appl. No. 13/667,456, Jan. 2, 2013.

Wattenhofer, "Principles of Distributed Computing", Apr. 2005, 5 pages, Distributed Computing Group, Zurich.

Wikipedia, "Graphical user interface", Mar. 2007, 5 pages, Wikipedia.org (online publication), URL: http://en.wikipedia.org/wiki/Graphical_user_interface.

Vadhiyar et al., "Performance Modeling for Self Adapting Collective Communications for MPI", Los Alamos Computer Science Institute (LACSI) Symposium, Oct. 2001, 15 pages, LACSI, Rice University, Houston TX.

Final Office Action, U.S. Appl. No. 11/924,934, May 22, 2014, pp. 1-20.

Notice of Allowance, U.S. Appl. No. 13/663,545, Jul. 16, 2014, pp. 1-22.

\* cited by examiner

MINIMALLY BUFFERED DATA TRANSFERS BETWEEN NODES IN A DATA COMMUNICATIONS NETWORK

STATEMENT REGARDING FEDERALLY SPONSORED RESEARCH OR DEVELOPMENT

This invention was made with Government support under Contract No. B554331 awarded by the Department of Energy. The Government has certain rights in this invention.

BACKGROUND OF THE INVENTION

1. Field of the Invention

The field of the invention is data processing, or, more specifically, methods, apparatus, and products for minimally buffered data transfers between nodes in a data communications network.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

Parallel computing is an area of computer technology that has experienced advances. Parallel computing is the simultaneous execution of the same task (split up and specially adapted) on multiple processors in order to obtain results faster. Parallel computing is based on the fact that the process of solving a problem usually can be divided into smaller tasks, which may be carried out simultaneously with some coordination.

Parallel computers execute parallel algorithms. A parallel algorithm can be split up to be executed a piece at a time on many different processing devices, and then put back together again at the end to get a data processing result. Some algorithms are easy to divide up into pieces. Splitting up the job of checking all of the numbers from one to a hundred thousand to see which are primes could be done, for example, by assigning a subset of the numbers to each available processor, and then putting the list of positive results back together. In this specification, the multiple processing devices that execute the individual pieces of a parallel program are referred to as 'compute nodes.' A parallel computer is composed of compute nodes and other processing nodes as well, including, for example, input/output ('I/O') nodes, and service nodes.

Parallel algorithms are valuable because it is faster to perform some kinds of large computing tasks via a parallel algorithm than it is via a serial (non-parallel) algorithm, because of the way modern processors work. It is far more difficult to construct a computer with a single fast processor than one with many slow processors with the same throughput. There are also certain theoretical limits to the potential speed of serial processors. On the other hand, every parallel algorithm has a serial part and so parallel algorithms have a saturation point. After that point adding more processors does not yield any more throughput but only increases the overhead and cost.

Parallel algorithms are designed also to optimize one more resource the data communications requirements among the nodes of a parallel computer. There are two ways parallel processors communicate, shared memory or message passing. Shared memory processing needs additional locking for the data and imposes the overhead of additional processor and bus cycles and also serializes some portion of the algorithm.

Message passing processing uses high-speed data communications networks and message buffers, but this communication adds transfer overhead on the data communications networks as well as additional memory need for message buffers and latency in the data communications among nodes. Designs of parallel computers use specially designed data communications links so that the communication overhead will be small but it is the parallel algorithm that decides the volume of the traffic.

Many data communications network architectures are used for message passing among nodes in parallel computers. Compute nodes may be organized in a network as a 'torus' or 'mesh,' for example. Also, compute nodes may be organized in a network as a tree. A torus network connects the nodes in a three-dimensional mesh with wrap around links. Every node is connected to its six neighbors through this torus network, and each node is addressed by its x, y, z coordinate in the mesh. In such a manner, a torus network lends itself to point to point operations. In a tree network, the nodes typically are connected into a binary tree: each node has a parent, and two children (although some nodes may only have zero children or one child, depending on the hardware configuration). Although a tree network typically is inefficient in point to point communication, a tree network does provide high bandwidth and low latency for certain collective operations, message passing operations where all compute nodes participate simultaneously, such as, for example, an all gather operation. In computers that use a torus and a tree network, the two networks typically are implemented independently of one another, with separate routing circuits, separate physical links, and separate message buffers.

In systems that utilize such high-speed data communications networks to effect message passing operations, processor speed of the individual compute nodes is not significantly faster than the network transmission speed. The overhead required to copy data to and from temporary buffers before and after each transmission therefore significantly affects the overall time required to pass a message from an origin node to a target node. Often the data being passed from an application on the origin node to an application on the target node is interpreted using different complex data types by the origin node application and the target node application. In such cases, a temporary buffer on the target node is typically used to store the data while the target node reconstitutes the data in application storage according to the complex data type that is used by the target node application. As mentioned above, however, additional buffering of the data decreases the overall transmission speed between the origin node application and the target node application. Readers will therefore recognize that the need exists for minimally buffered data transfers between nodes in a data communications network.

SUMMARY OF THE INVENTION

Methods, apparatus, and products for minimally buffered data transfers between nodes in a data communications network are disclosed that include: receiving, by an origin messaging module on an origin node from an application on the origin node, a storage identifier, a complex origin data type, and a complex target data type, the storage identifier specifying origin application storage containing data on the origin node, the complex origin data type describing a subset of the data contained in the origin application storage, the complex target data type describing an arrangement of the subset of the data in target application storage on a target node; creating, by the origin messaging module, origin metadata describing the complex origin data type; selecting, by the origin messaging module from the origin application storage in dependence upon the origin metadata and the storage identifier, the subset of the data for transmission to the target node; and transmitting, by the origin messaging module to a target messaging module on the target node, the selected subset of the data for storing in the target application storage in dependence upon the complex target data type without buffering the subset of the data in a temporary buffer on the target node.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
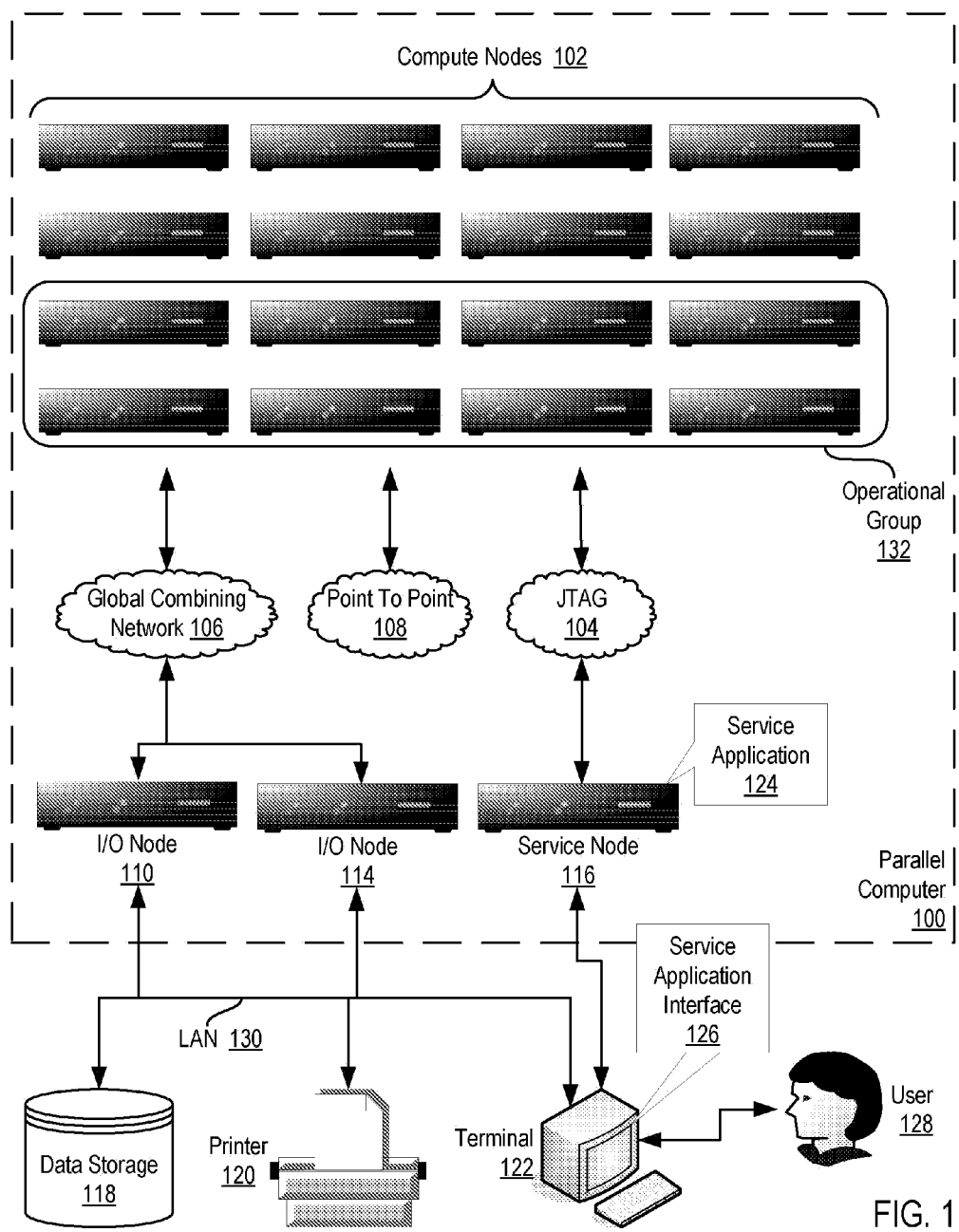
FIG. 1 illustrates an exemplary system for minimally buffered data transfers between nodes in a data communications network according to embodiments of the present invention.

Exemplary methods, apparatus, and computer program products for minimally buffered data transfers between nodes in a data communications network according to embodiments of the present invention are described with reference to the accompanying drawings, beginning with FIG. 1. FIG. 1 illustrates an exemplary system for minimally buffered data transfers between nodes in a data communications network according to embodiments of the present invention. The system of FIG. 1 includes a parallel computer (100), non-volatile memory for the computer in the form of data storage device (118), an output device for the computer in the form of printer (120), and an input/output device for the computer in the form of computer terminal (122). Parallel computer (100) in the example of FIG. 1 includes a plurality of compute nodes (102).

The compute nodes (102) are coupled for data communications by several independent data communications networks including a Joint Test Action Group ('JTAG') network (104), a global combining network (106) which is optimized for collective operations, and a torus network (108) which is optimized point to point operations. The global combining network (106) is a data communications network that includes data communications links connected to the compute nodes so as to organize the compute nodes as a tree. Each data communications network is implemented with data communications links among the compute nodes (102). The data communications links provide data communications for parallel operations among the compute nodes of the parallel computer. The links between compute nodes are bi-directional links that are typically implemented using two separate directional data communications paths.

In addition, the compute nodes (102) of parallel computer are organized into at least one operational group (132) of compute nodes for collective parallel operations on parallel computer (100). An operational group of compute nodes is the set of compute nodes upon which a collective parallel operation executes. Collective operations are implemented with data communications among the compute nodes of an operational group. Collective operations are those functions that involve all the compute nodes of an operational group. A collective operation is an operation, a message-passing computer program instruction that is executed simultaneously, that is, at approximately the same time, by all the compute nodes in an operational group of compute nodes. Such an operational group may include all the compute nodes in a parallel computer (100) or a subset all the compute nodes. Collective operations are often built around point to point operations. A collective operation requires that all processes on all compute nodes within an operational group call the same collective operation with matching arguments. A 'broadcast' is an example of a collective operation for moving data among compute nodes of an operational group. A 'reduce' operation is an example of a collective operation that executes arithmetic or logical functions on data distributed among the compute nodes of an operational group. An operational group may be implemented as, for example, an MPI 'communicator.'

'MPI' refers to 'Message Passing Interface,' a prior art parallel communications library, a module of computer program instructions for data communications on parallel computers. Examples of prior-art parallel communications libraries that may be improved for use with systems according to embodiments of the present invention include MPI and the 'Parallel Virtual Machine' ('PVM') library. PVM was developed by the University of Tennessee, The Oak Ridge National Laboratory, and Emory University. MPI is promulgated by the MPI Forum, an open group with representatives from many organizations that define and maintain the MPI standard. MPI at the time of this writing is a de facto standard for communication among compute nodes running a parallel program on a distributed memory parallel computer. This specification sometimes uses MPI terminology for ease of explanation, although the use of MPI as such is not a requirement or limitation of the present invention.

Some collective operations have a single originating or receiving process running on a particular compute node in an operational group. For example, in a 'broadcast' collective operation, the process on the compute node that distributes the data to all the other compute nodes is an originating process. In a 'gather' operation, for example, the process on the compute node that received all the data from the other compute nodes is a receiving process. The compute node on which such an originating or receiving process runs is referred to as a logical root.

Most collective operations are variations or combinations of four basic operations: broadcast, gather, scatter, and reduce. The interfaces for these collective operations are defined in the MPI standards promulgated by the MPI Forum. Algorithms for executing collective operations, however, are not defined in the MPI standards. In a broadcast operation, all processes specify the same root process, whose buffer contents will be sent. Processes other than the root specify receive buffers. After the operation, all buffers contain the message from the root process.

In a scatter operation, the logical root divides data on the root into segments and distributes a different segment to each compute node in the operational group. In scatter operation, all processes typically specify the same receive count. The send arguments are only significant to the root process, whose buffer actually contains sendcount*N elements of a given data type, where N is the number of processes in the given group of compute nodes. The send buffer is divided and dispersed to all processes (including the process on the logical root). Each compute node is assigned a sequential identifier termed a 'rank.' After the operation, the root has sent sendcount data elements to each process in increasing rank order. Rank 0 receives the first sendcount data elements from the send buffer. Rank 1 receives the second sendcount data elements from the send buffer, and so on.

A gather operation is a many-to-one collective operation that is a complete reverse of the description of the scatter operation. That is, a gather is a many-to-one collective operation in which elements of a datatype are gathered from the ranked compute nodes into a receive buffer in a root node.

A reduce operation is also a many-to-one collective operation that includes an arithmetic or logical function performed on two data elements. All processes specify the same 'count' and the same arithmetic or logical function. After the reduction, all processes have sent count data elements from computer node send buffers to the root process. In a reduction operation, data elements from corresponding send buffer locations are combined pair-wise by arithmetic or logical operations to yield a single corresponding element in the root process's receive buffer. Application specific reduction operations can be defined at runtime. Parallel communications libraries may support predefined operations. MPI, for example, provides the following predefined reduction operations:

| | |
|---|---|
| MPI_MAX | maximum |
| MPI_MIN | minimum |
| MPI_SUM | sum |
| MPI_PROD | product |
| MPI_LAND | logical and |
| MPI_BAND | bitwise and |
| MPI_LOR | logical or |
| MPI_BOR | bitwise or |
| MPI_LXOR | logical exclusive or |
| MPI_BXOR | bitwise exclusive or |

In addition to compute nodes, the parallel computer (100) includes input/output ('I/O') nodes (110, 114) coupled to compute nodes (102) through the global combining network (106). The compute nodes in the parallel computer (100) are partitioned into processing sets such that each compute node in a processing set is connected for data communications to the same I/O node. Each processing set, therefore, is composed of one I/O node and a subset of compute nodes (102). The ratio between the number of compute nodes to the number of I/O nodes in the entire system typically depends on the hardware configuration for the parallel computer. For example, in some configurations, each processing set may be composed of eight compute nodes and one I/O node. In some other configurations, each processing set may be composed of sixty-four compute nodes and one I/O node. Such example are for explanation only, however, and not for limitation. Each I/O nodes provide I/O services between compute nodes (102) of its processing set and a set of I/O devices. In the example of FIG. 1, the I/O nodes (110, 114) are connected for data communications I/O devices (118, 120, 122) through local area network ('LAN') (130) implemented using high-speed Ethernet.

The parallel computer (100) of FIG. 1 also includes a service node (116) coupled to the compute nodes through one of the networks (104). Service node (116) provides services common to pluralities of compute nodes, administering the configuration of compute nodes, loading programs into the compute nodes, starting program execution on the compute nodes, retrieving results of program operations on the computer nodes, and so on. Service node (116) runs a service application (124) and communicates with users (128) through a service application interface (126) that runs on computer terminal (122).

As described in more detail below in this specification, the system of FIG. 1 operates generally for minimally buffered data transfers between nodes in a data communications network according to embodiments of the present invention. The system of FIG. 1 operates generally for minimally buffered data transfers between nodes in a data communications network according to embodiments of the present invention as follows: receiving, by a origin messaging module on an origin node from an application on the origin node, a storage identifier, a complex origin data type, and a complex target data type, the storage identifier specifying origin application storage containing data on the origin node, the complex origin data type describing a subset of the data contained in the application storage, the complex target data type describing an arrangement of the subset of the data in target application storage on a target node; creating, by the origin messaging module, origin metadata describing the complex origin data type; selecting, by the origin messaging module from the application storage in dependence upon the origin metadata and the storage identifier, the subset of the data for transmission to the target node; transmitting, by the origin messaging module to a target messaging module on the target node, the selected subset of the data for storing in the target application storage in dependence upon the complex target data type without buffering the subset of the data in a temporary buffer on the target node. Readers will note that the origin node is a node that initiates a data transfer with another node. The target node is a node that participates in the data transfer initiated by the origin node.

The arrangement of nodes, networks, and I/O devices making up the exemplary system illustrated in FIG. 1 are for explanation only, not for limitation of the present invention. Data processing systems capable of minimally buffered data transfers between nodes in a data communications network according to embodiments of the present invention may include additional nodes, networks, devices, and architectures, not shown in FIG. 1, as will occur to those of skill in the art. Although the parallel computer (100) in the example of FIG. 1 includes sixteen compute nodes (102), readers will note that parallel computers capable of minimally buffered data transfers between nodes in a data communications network according to embodiments of the present invention may include any number of compute nodes. In addition to Ethernet and JTAG, networks in such data processing systems may support many data communications protocols including for example TCP (Transmission Control Protocol), IP (Internet Protocol), and others as will occur to those of skill in the art. Various embodiments of the present invention may be implemented on a variety of hardware platforms in addition to those illustrated in FIG. 1.

Readers will note that the description above of minimally buffered data transfers between nodes in a data communications network according to embodiments of the present invention using a parallel computer is for explanation and not for limitation. In fact, minimally buffered data transfers between nodes in a data communications network according to embodiments of the present invention may be carried out in any system of nodes connected for data communications through a data communications network as will occur to those of skill in the art. Such systems may include distributed computing systems, cluster computing systems, grid computing systems, and so on.

Minimally buffered data transfers between nodes in a data communications network according to embodiments of the present invention may be generally implemented on a parallel computer that includes a plurality of compute nodes. In fact, such computers may include thousands of such compute nodes. Each compute node is in turn itself a kind of computer composed of one or more computer processors (or processing cores), its own computer memory, and its own input/output adapters. For further explanation, therefore, FIG. 2 sets forth a block diagram of an exemplary compute node useful in a parallel computer capable of minimally buffered data transfers between nodes in a data communications network according to embodiments of the present invention. The compute node (152) of FIG. 2 includes one or more processing cores (164) as well as random access memory ('RAM') (156). The processing cores (164) are connected to RAM (156) through a high-speed memory bus (154) and through a bus adapter (194) and an extension bus (168) to other components of the compute node (152). Stored in RAM (156) is an application program (158), a module of computer program instructions that carries out parallel, user-level data processing using parallel algorithms.

Also stored in RAM (156) is a messaging module (160), a library of computer program instructions that carry out parallel communications among compute nodes, including point to point operations as well as collective operations. Application program (158) executes collective operations by calling software routines in the messaging module (160). A library of parallel communications routines may be developed from scratch for use in systems according to embodiments of the present invention, using a traditional programming language such as the C programming language, and using traditional programming methods to write parallel communications routines that send and receive data among nodes on two independent data communications networks. Alternatively, existing prior art libraries may be improved to operate according to embodiments of the present invention. Examples of prior-art parallel communications libraries include the 'Message Passing Interface' ('MPI') library and the 'Parallel Virtual Machine' ('PVM') library.

Figure 2:
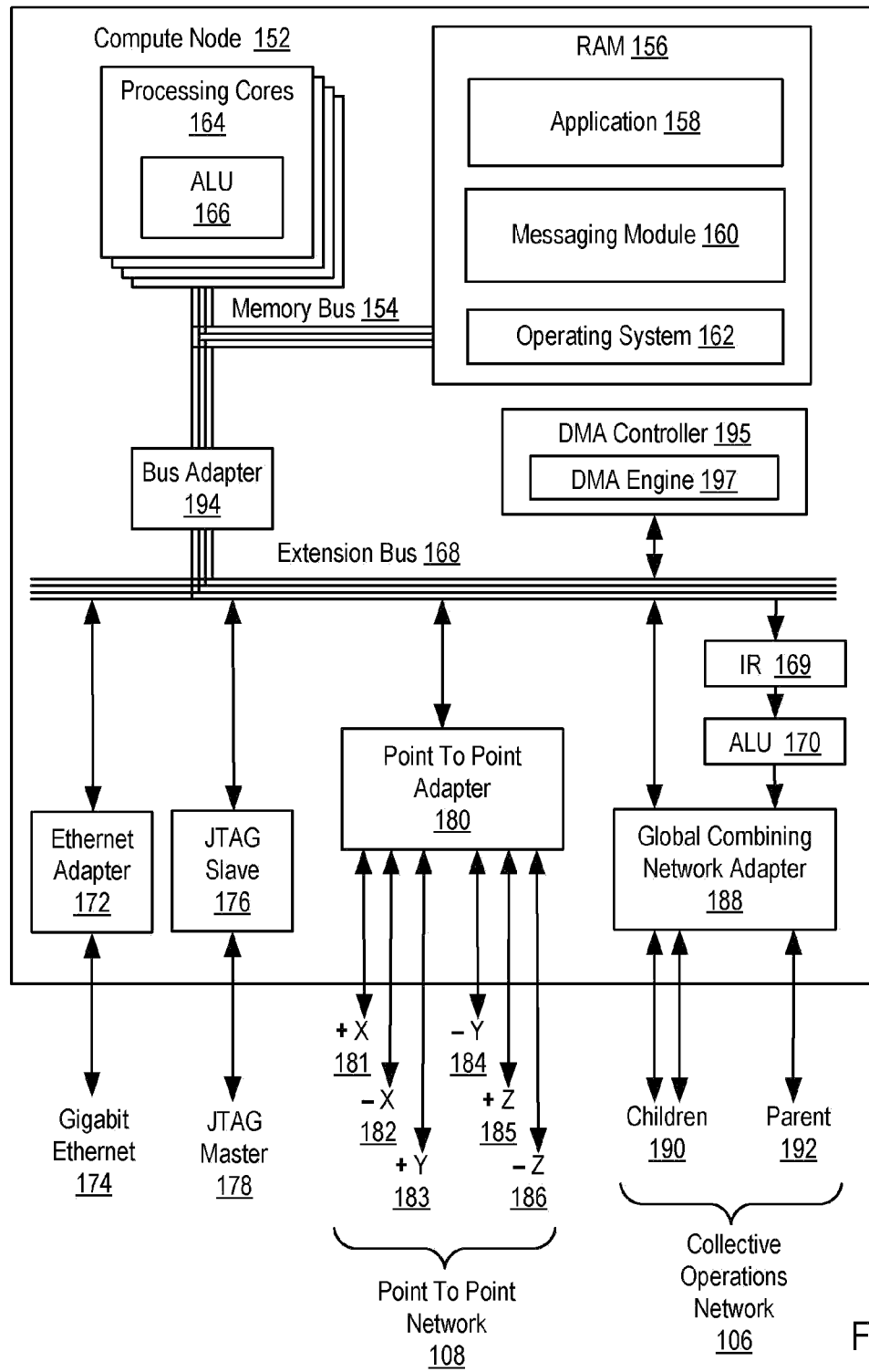
FIG. 2 sets forth a block diagram of an exemplary compute node useful in a parallel computer capable of minimally buffered data transfers between nodes in a data communications network according to embodiments of the present invention.

The messaging module (160) of FIG. 2 includes a set of computer program instructions for minimally buffered data transfers between nodes in a data communications network according to embodiments of the present invention. The messaging module (160) of FIG. 2 operates generally for minimally buffered data transfers between nodes in a data communications network according to embodiments of the present invention by: receiving, from the application (158), a storage identifier, a complex origin data type, and a complex target data type, the storage identifier specifying origin application storage containing data on the origin node (152), the complex origin data type describing a subset of the data contained in the application storage, the complex target data type describing an arrangement of the subset of the data in target application storage on a target node; creating origin metadata describing the complex origin data type; selecting, from the application storage in dependence upon the origin metadata and the storage identifier, the subset of the data for transmission to the target node; and transmitting, to a target messaging module on the target node, the selected subset of the data for storing in the target application storage in dependence upon the complex target data type without buffering the subset of the data in a temporary buffer on the target node.

In some embodiments the complex target data type received from the application (158) is the same as the complex origin data type. In such embodiments, the messaging module (160) of FIG. 2 may transmit, to a target messaging module on the target node, the selected subset of the data for storing in the target application storage in dependence upon the complex target data type without buffering the subset of the data in a temporary buffer on the target node by: contiguously storing the selected subset of the data in a temporary buffer on the origin node (152); and transmitting, from the temporary buffer on the origin node (152) in a single data transfer operation, the subset of the data along with the origin metadata describing the complex origin data type.

In some embodiments the message module (160) of FIG. 2 may also operate generally for minimally buffered data transfers between nodes in a data communications network according to embodiments of the present invention by: creating target metadata describing the complex target data type. In such embodiments, the messaging module (160) of FIG. 2 may transmit, to a target messaging module on the target node, the selected subset of the data for storing in the target application storage in dependence upon the complex target data type without buffering the subset of the data in a temporary buffer on the target node by: contiguously storing the selected subset of the data in a temporary buffer on the origin node (152), and transmitting, from the temporary buffer on the origin node (152) in multiple data transfer operations, the selected subset of the data according to the target metadata. In other embodiments where the messaging module (160) of FIG. 2 creates target metadata describing the complex target data type, the messaging module (160) may transmit, to a target messaging module on the target node, the selected subset of the data for storing in the target application storage in dependence upon the complex target data type without buffering the subset of the data in a temporary buffer on the target node by: transmitting, from the application storage in multiple data transfer operations, the selected subset of the data according to both the origin metadata and the target metadata.

Also stored in RAM (156) is an operating system (162), a module of computer program instructions and routines for an application program's access to other resources of the compute node. It is typical for an application program and parallel communications library in a compute node of a parallel computer to run a single thread of execution with no user login and no security issues because the thread is entitled to complete access to all resources of the node. The quantity and complexity of tasks to be performed by an operating system on a compute node in a parallel computer therefore are smaller and less complex than those of an operating system on a serial computer with many threads running simultaneously. In addition, there is no video I/O on the compute node (152) of FIG. 2, another factor that decreases the demands on the operating system. The operating system may therefore be quite lightweight by comparison with operating systems of general purpose computers, a pared down version as it were, or an operating system developed specifically for operations on a particular parallel computer. Operating systems that may usefully be improved, simplified, for use in a compute node include UNIX™, Linux™, Microsoft XP™, AIX™™, IBM's i5/OS™, and others as will occur to those of skill in the art.

The exemplary compute node (152) of FIG. 2 includes several communications adapters (172, 176, 180, 188) for implementing data communications with other nodes of a parallel computer. Such data communications may be carried out serially through RS-232 connections, through external buses such as Universal Serial Bus ('USB'), through data communications networks such as IP networks, and in other ways as will occur to those of skill in the art. Communications adapters implement the hardware level of data communications through which one computer sends data communications to another computer, directly or through a network. Examples of communications adapters useful in systems for minimally buffered data transfers between nodes in a data communications network according to embodiments of the present invention include modems for wired communications, Ethernet (IEEE 802.3) adapters for wired network communications, and 802.11b adapters for wireless network communications.

The data communications adapters in the example of FIG. 2 include a Gigabit Ethernet adapter (172) that couples example compute node (152) for data communications to a Gigabit Ethernet (174). Gigabit Ethernet is a network transmission standard, defined in the IEEE 802.3 standard, that provides a data rate of 1 billion bits per second (one gigabit). Gigabit Ethernet is a variant of Ethernet that operates over multimode fiber optic cable, single mode fiber optic cable, or unshielded twisted pair.

The data communications adapters in the example of FIG. 2 includes a JTAG Slave circuit (176) that couples example compute node (152) for data communications to a JTAG Master circuit (178). JTAG is the usual name used for the IEEE 1149.1 standard entitled Standard Test Access Port and Boundary-Scan Architecture for test access ports used for testing printed circuit boards using boundary scan. JTAG is so widely adapted that, at this time, boundary scan is more or less synonymous with JTAG. JTAG is used not only for printed circuit boards, but also for conducting boundary scans of integrated circuits, and is also useful as a mechanism for debugging embedded systems, providing a convenient "back door" into the system. The example compute node of FIG. 2 may be all three of these: It typically includes one or more integrated circuits installed on a printed circuit board and may be implemented as an embedded system having its own processor, its own memory, and its own I/O capability. JTAG boundary scans through JTAG Slave (176) may efficiently configure processor registers and memory in compute node (152) for use in minimally buffered data transfers between nodes in a data communications network according to embodiments of the present invention.

The data communications adapters in the example of FIG. 2 includes a Point To Point Adapter (180) that couples example compute node (152) for data communications to a network (108) that is optimal for point to point message passing operations such as, for example, a network configured as a three-dimensional torus or mesh. Point To Point Adapter (180) provides data communications in six directions on three communications axes, x, y, and z, through six bidirectional links: +x (181), −x (182), +y (183), −y (184), +z (185), and −z (186).

The data communications adapters in the example of FIG. 2 includes a Global Combining Network Adapter (188) that couples example compute node (152) for data communications to a network (106) that is optimal for collective message passing operations on a global combining network configured, for example, as a binary tree. The Global Combining Network Adapter (188) provides data communications through three bidirectional links: two to children nodes (190) and one to a parent node (192).

Example compute node (152) includes two arithmetic logic units ('ALUs'). ALU (166) is a component of each processing core (164), and a separate ALU (170) is dedicated to the exclusive use of Global Combining Network Adapter (188) for use in performing the arithmetic and logical functions of reduction operations. Computer program instructions of a reduction routine in parallel communications library (160) may latch an instruction for an arithmetic or logical function into instruction register (169). When the arithmetic or logical function of a reduction operation is a 'sum' or a 'logical or,' for example, Global Combining Network Adapter (188) may execute the arithmetic or logical operation by use of ALU (166) in processor (164) or, typically much faster, by use dedicated ALU (170).

The example compute node (152) of FIG. 2 includes a direct memory access ('DMA') controller (195), which is computer hardware for direct memory access and a DMA engine (197), which is computer software for direct memory access. The DMA engine (197) of FIG. 2 is typically stored in computer memory of the DMA controller (195). Direct memory access includes reading and writing to memory of compute nodes with reduced operational burden on the central processing units (164). A DMA transfer essentially copies a block of memory from one location to another, typically from one compute node to another. While the CPU may initiate the DMA transfer, the CPU does not execute it.

Figure 3A:
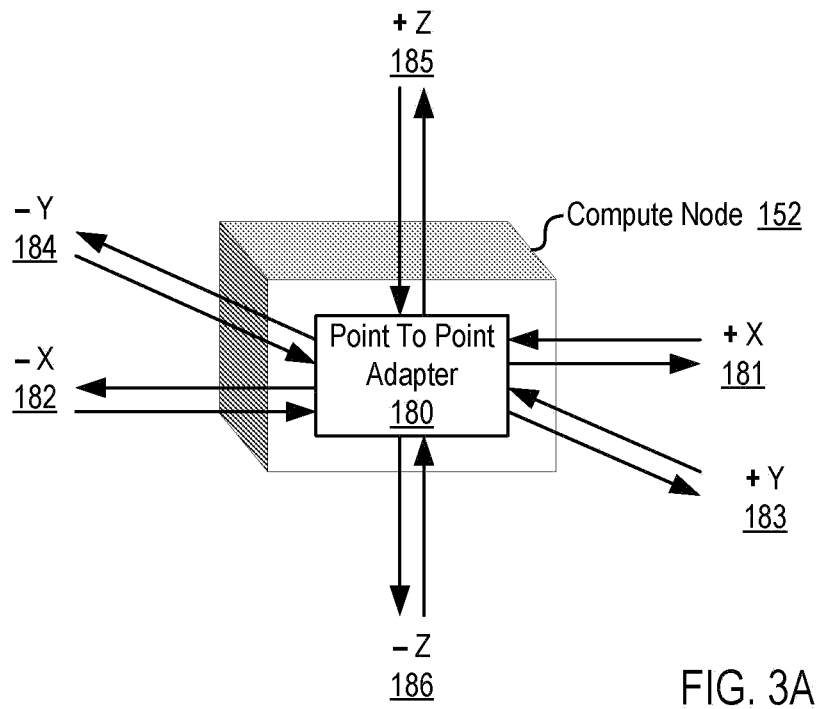
FIG. 3A illustrates an exemplary Point To Point Adapter useful in systems capable of minimally buffered data transfers between nodes in a data communications network according to embodiments of the present invention.

For further explanation, FIG. 3A illustrates an exemplary Point To Point Adapter (180) useful in systems capable of minimally buffered data transfers between nodes in a data communications network according to embodiments of the present invention. Point To Point Adapter (180) is designed for use in a data communications network optimized for point to point operations, a network that organizes compute nodes in a three-dimensional torus or mesh. Point To Point Adapter (180) in the example of FIG. 3A provides data communication along an x-axis through four unidirectional data communications links, to and from the next node in the −x direction (182) and to and from the next node in the +x direction (181). Point To Point Adapter (180) also provides data communication along a y-axis through four unidirectional data communications links, to and from the next node in the −y direction (184) and to and from the next node in the +y direction (183). Point To Point Adapter (180) in FIG. 3A also provides data communication along a z-axis through four unidirectional data communications links, to and from the next node in the −z direction (186) and to and from the next node in the +z direction (185).

Figure 3B:
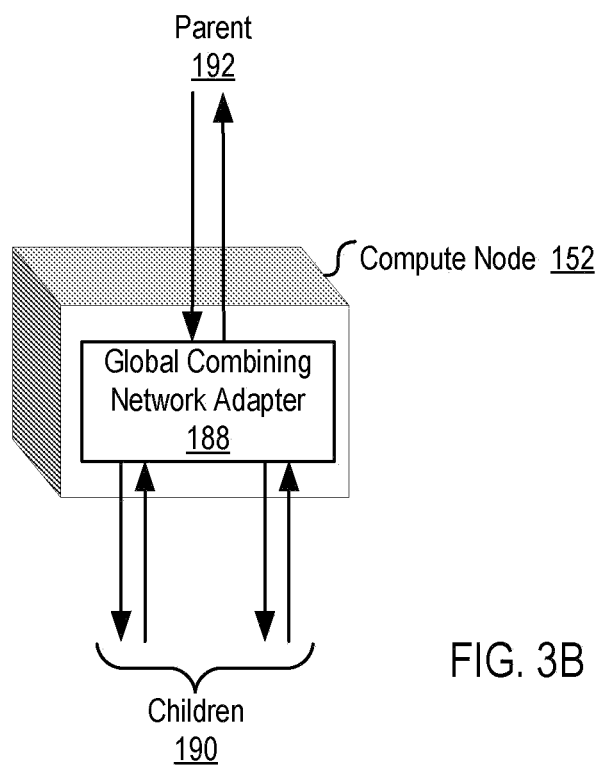
FIG. 3B illustrates an exemplary Global Combining Network Adapter useful in systems capable of minimally buffered data transfers between nodes in a data communications network according to embodiments of the present invention.

For further explanation, FIG. 3B illustrates an exemplary Global Combining Network Adapter (188) useful in systems capable of minimally buffered data transfers between nodes in a data communications network according to embodiments of the present invention. Global Combining Network Adapter (188) is designed for use in a network optimized for collective operations, a network that organizes compute nodes of a parallel computer in a binary tree. Global Combining Network Adapter (188) in the example of FIG. 3B provides data communication to and from two children nodes through four unidirectional data communications links (190). Global Combining Network Adapter (188) also provides data communication to and from a parent node through two unidirectional data communications links (192).

Figure 4:
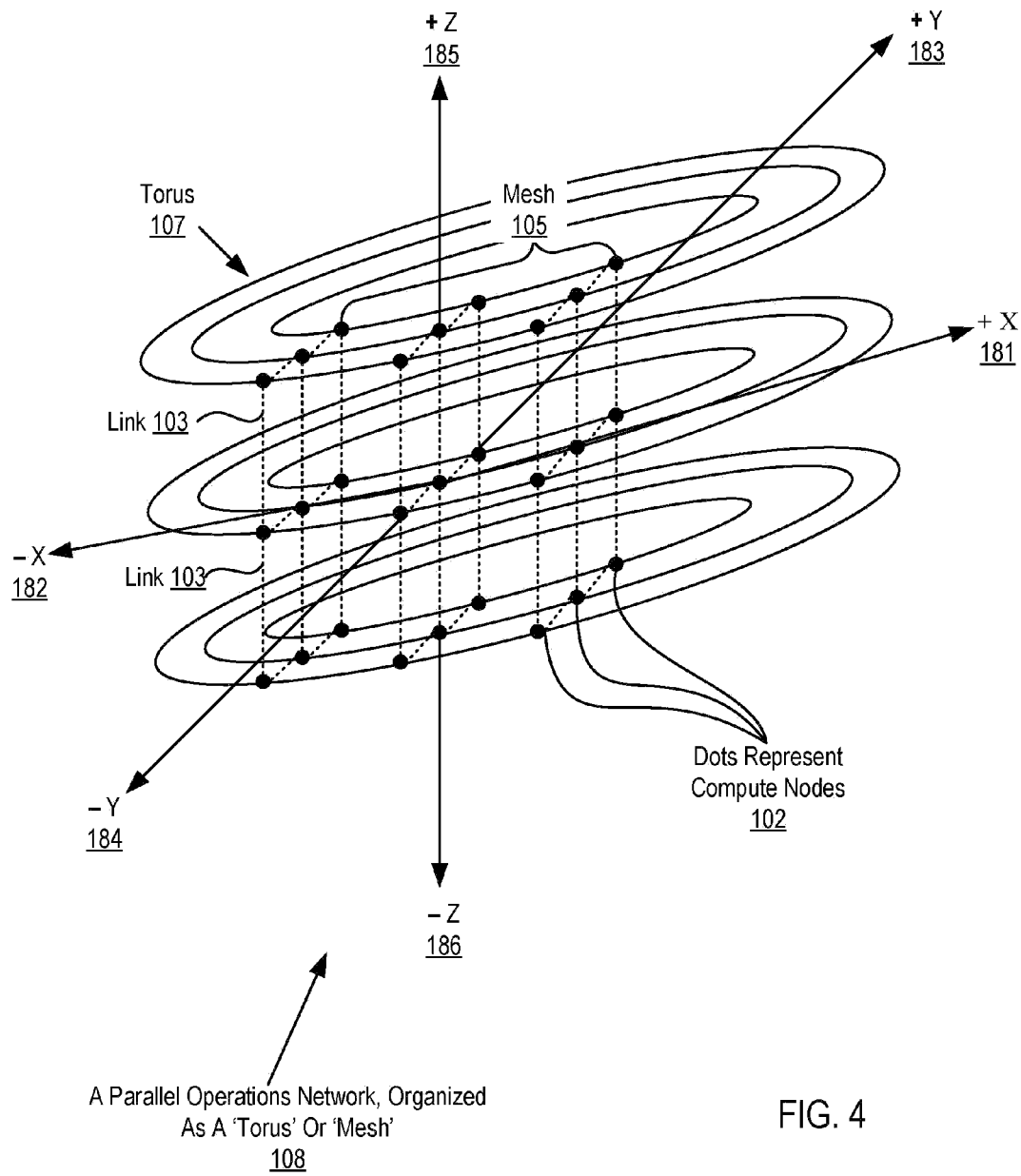
FIG. 4 sets forth a line drawing illustrating an exemplary data communications network optimized for point to point operations useful in systems capable of minimally buffered data transfers between nodes in a data communications network in accordance with embodiments of the present invention.

For further explanation, FIG. 4 sets forth a line drawing illustrating an exemplary data communications network (108) optimized for point to point operations useful in systems capable of minimally buffered data transfers between nodes in a data communications network in accordance with embodiments of the present invention. In the example of FIG. 4, dots represent compute nodes (102) of a parallel computer, and the dotted lines between the dots represent data communications links (103) between compute nodes. The data communications links are implemented with point to point data communications adapters similar to the one illustrated for example in FIG. 3A, with data communications links on three axes, x, y, and z, and to and fro in six directions +x (181), −x (182), +y (183), −y (184), +z (185), and −z (186). The links and compute nodes are organized by this data communications network optimized for point to point operations into a three dimensional mesh (105). The mesh (105) has wrap-around links on each axis that connect the outermost compute nodes in the mesh (105) on opposite sides of the mesh (105). These wrap-around links form part of a torus (107). Each compute node in the torus has a location in the torus that is uniquely specified by a set of x, y, z coordinates. Readers will note that the wrap-around links in the y and z directions have been omitted for clarity, but are configured in a similar manner to the wrap-around link illustrated in the x direction. For clarity of explanation, the data communications network of FIG. 4 is illustrated with only 27 compute nodes, but readers will recognize that a data communications network optimized for point to point operations for use in minimally buffered data transfers between nodes in a data communications network in accordance with embodiments of the present invention may contain only a few compute nodes or may contain thousands of compute nodes.

Figure 5:
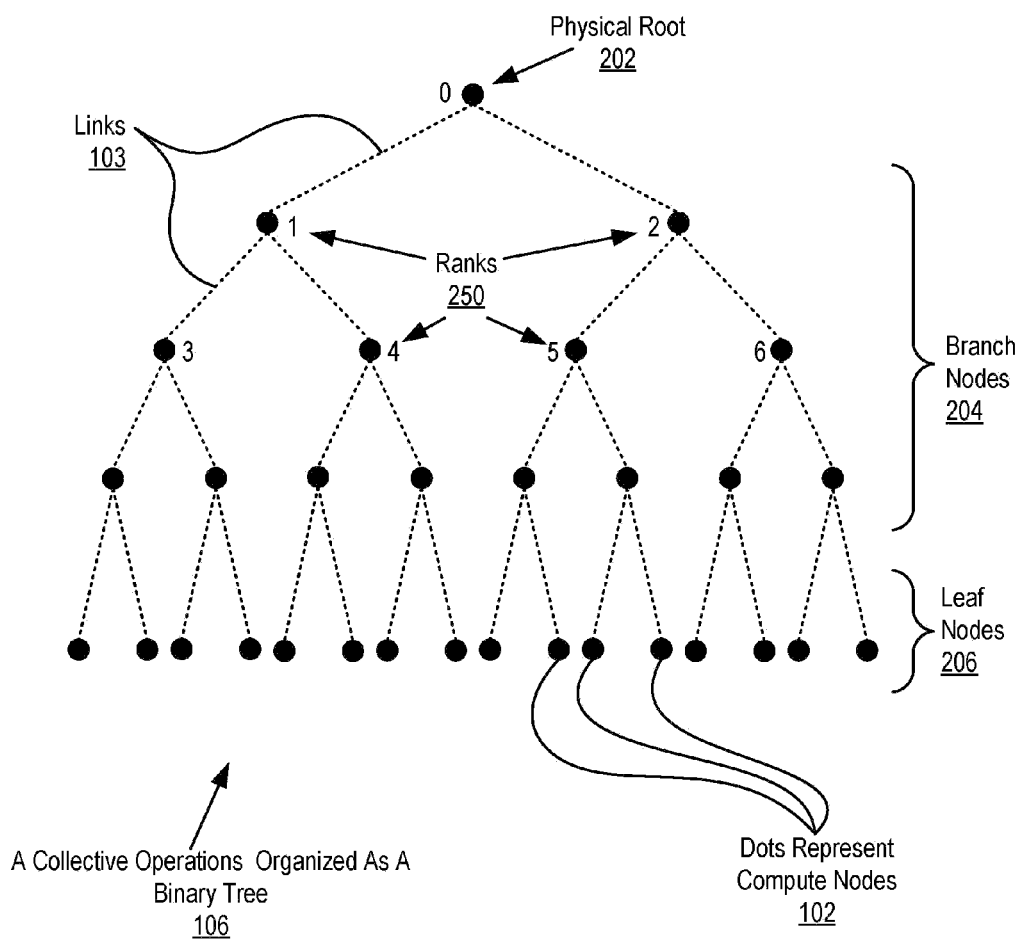
FIG. 5 sets forth a line drawing illustrating an exemplary data communications network optimized for collective operations useful in systems capable of minimally buffered data transfers between nodes in a data communications network in accordance with embodiments of the present invention.

For further explanation, FIG. 5 sets forth a line drawing illustrating an exemplary data communications network (106) optimized for collective operations useful in systems capable of minimally buffered data transfers between nodes in a data communications network in accordance with embodiments of the present invention. The example data communications network of FIG. 5 includes data communications links connected to the compute nodes so as to organize the compute nodes as a tree. In the example of FIG. 5, dots represent compute nodes (102) of a parallel computer, and the dotted lines (103) between the dots represent data communications links between compute nodes. The data communications links are implemented with global combining network adapters similar to the one illustrated for example in FIG. 3B, with each node typically providing data communications to and from two children nodes and data communications to and from a parent node, with some exceptions. Nodes in a binary tree (106) may be characterized as a physical root node (202), branch nodes (204), and leaf nodes (206). The root node (202) has two children but no parent. The leaf nodes (206) each has a parent, but leaf nodes have no children. The branch nodes (204) each has both a parent and two children. The links and compute nodes are thereby organized by this data communications network optimized for collective operations into a binary tree (106). For clarity of explanation, the data communications network of FIG. 5 is illustrated with only 31 compute nodes, but readers will recognize that a data communications network optimized for collective operations for use in systems for minimally buffered data transfers between nodes in a data communications network accordance with embodiments of the present invention may contain only a few compute nodes or may contain thousands of compute nodes.

In the example of FIG. 5, each node in the tree is assigned a unit identifier referred to as a 'rank' (250). A node's rank uniquely identifies the node's location in the tree network for use in both point to point and collective operations in the tree network.

The ranks in this example are assigned as integers beginning with 0 assigned to the root node (202), 1 assigned to the first node in the second layer of the tree, 2 assigned to the second node in the second layer of the tree, 3 assigned to the first node in the third layer of the tree, 4 assigned to the second node in the third layer of the tree, and so on. For ease of illustration, only the ranks of the first three layers of the tree are shown here, but all compute nodes in the tree network are assigned a unique rank.

Figure 6:
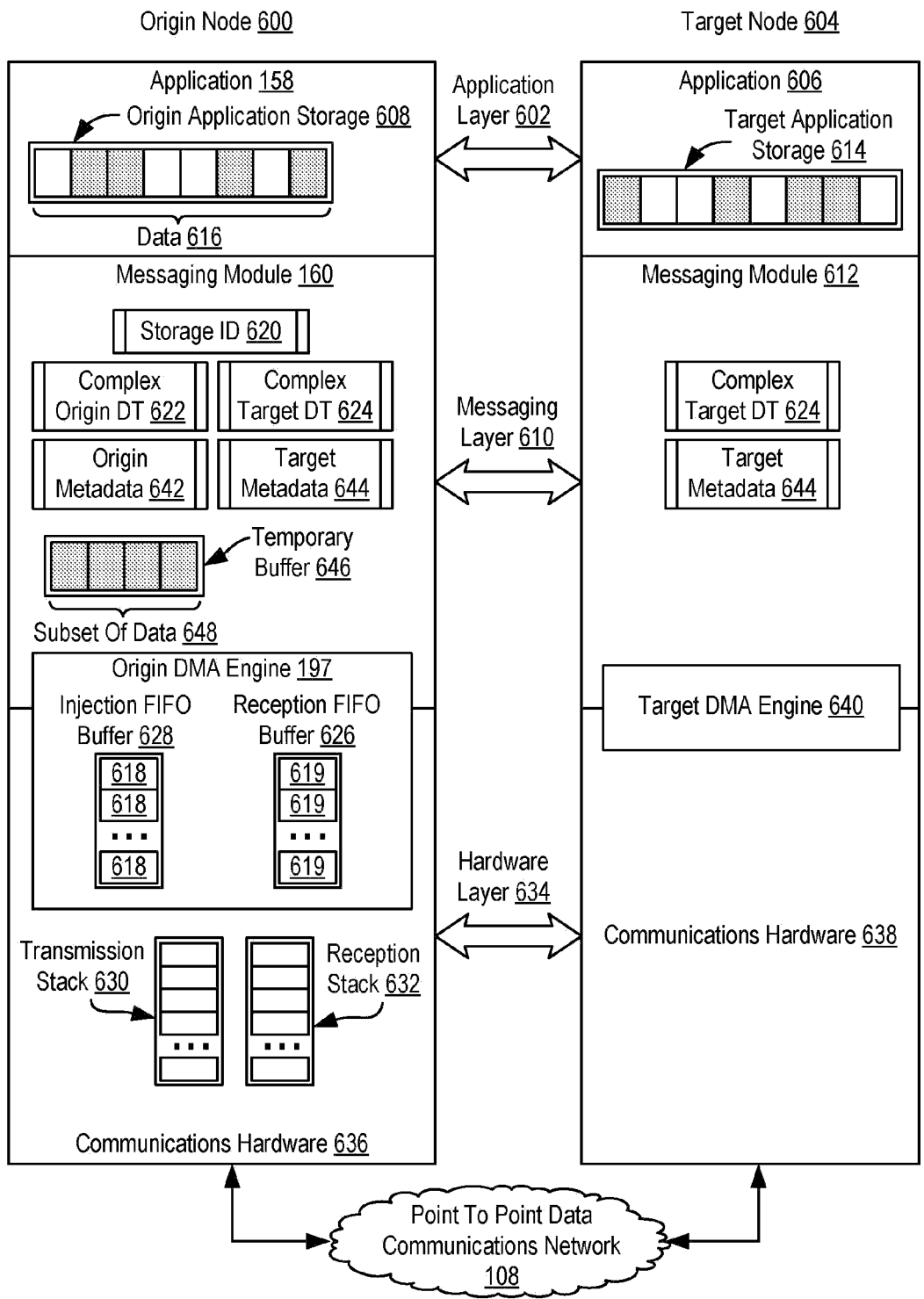
FIG. 6 sets forth a block diagram illustrating an exemplary communications architecture illustrated as a protocol stack useful in minimally buffered data transfers between nodes in a data communications network according to embodiments of the present invention.

For further explanation, FIG. 6 sets forth a block diagram illustrating an exemplary communications architecture illustrated as a protocol stack useful in minimally buffered data transfers between nodes in a data communications network according to embodiments of the present invention. The exemplary communications architecture of FIG. 6 sets forth two nodes, an origin node (600) and a target node (604). Only two nodes are illustrated in the example of FIG. 6 for ease of explanation and not for limitation. In fact, minimally buffered data transfers between nodes in a data communications network according to embodiments of the present invention may be implemented using many nodes in very large scale computer systems such as parallel computers with thousands of nodes.

The exemplary communications architecture of FIG. 6 includes an application layer (602) composed of an application (158) installed on the origin node (600) and an application (606) installed on the target node (604). In the example of FIG. 6, the applications (158, 606) typically communicate by passing messages. Data communications between applications (158, 606) are effected using messaging modules (160, 612) installed on each of the nodes (600, 604). Applications (158, 606) may communicate by invoking function of an application programming interfaces ('API') exposed by the application messaging modules (606, 612). For the application (158) to transmit an application message to the application (606), the application (158) of FIG. 6 may invoke a function of an API for messaging module (160) that passes a buffer identifier of an application buffer containing the application message to the messaging module (160).

The exemplary communications architecture of FIG. 6 includes a messaging layer (610) that implements data communications protocols for data communications that support messaging in the application layer (602). Such data communications protocols are typically invoked through a set of APIs that are exposed to the applications (158 and 606) in the application layer (602). In the example of FIG. 6, the messaging layer (610) is composed of messaging module (160) installed on the origin node (600) and messaging module (612) installed on the target node (604).

The exemplary communications architecture of FIG. 6 includes a hardware layer (634) that defines the physical implementation and the electrical implementation of aspects of the hardware on the nodes such as the bus, network cabling, connector types, physical data rates, data transmission encoding and may other factors for communications between the nodes (600 and 604) on the physical network medium. The hardware layer (634) of FIG. 6 is composed of communications hardware (636) of the origin node (600), communications hardware (638) of the target node (636), and the data communications network (108) connecting the origin node (600) to the target node (604). Such communications hardware may include, for example, point-to-point adapters and DMA controllers as described above with reference to FIGS. 2 and 3A. In the example of FIG. 6, the communications hardware (636) includes a transmission stack (630) for storing network packets for transmission to other communications hardware through the data communications network (108) and includes a reception stack (632) for storing network packets received from other communications hardware through the data communications network (108).

The exemplary communications architecture of FIG. 6 illustrates a DMA engine (197) for the origin node (600) and a DMA engine (640) for the target node (604). The DMA engine (197) in the example of FIG. 6 is illustrated in both the messaging module layer (610) and the hardware layer (634). The DMA engine (197) is shown in both the messaging layer (610) and the hardware layer (634) because a DMA engine useful in minimally buffered data transfers between nodes in a data communications network according to embodiments of the present invention may often provide messaging layer interfaces and also implement communications according to some aspects of the communication hardware layer (634). The exemplary DMA engine (197) of FIG. 6 includes an injection first-in-first-out ('FIFO') buffer (628) for storing data descriptors (618) that specify DMA transfer operations for transferring data. The exemplary DMA engine (197) of FIG. 6 also includes a reception FIFO buffer (626) used to receive network packets (619) from other DMA engines on other nodes. Although FIG. 6 only illustrates a single injection FIFO buffer (628) and a single reception FIFO buffer (626), readers will note that a DMA engine may have access to any number of injection FIFO buffers and reception FIFO buffers.

The exemplary communications architecture of FIG. 6 supports minimally buffered data transfers between nodes in a data communications network according to embodiments of the present invention as follows: In the example of FIG. 6, the origin messaging module (160) receives a storage identifier, a complex origin data type, and a complex target data type from the application (158) on the origin node (600). The storage identifier (620) specifies origin application storage (608) containing data (616) on the origin node (600). The complex origin data type (622) describes a subset (648) of the data (616) contained in the application storage (608). In the example of FIG. 6, the data (616) is illustrated as a set of eight blocks and the data subset (648) is illustrated as a set of four grey blocks among the data (616). The complex target data type (624) describes an arrangement of the subset (648) of the data (616) in target application storage (614) on a target node (604). The origin messaging module (160) of FIG. 6 then creates origin metadata (642) describing the complex origin data type. The origin messaging module (160) selects the subset (648) of the data (616) for transmission to the target node (604) from the origin application storage (608) in dependence upon the origin metadata (642) and the storage identifier (620). The origin messaging module (160) then transmits, to the target messaging module (612) on the target node (604), the selected subset (648) of the data for storing in the target application storage (614) in dependence upon the complex target data type (624) without buffering the subset (648) of the data (616) in a temporary buffer on the target node (604).

A data type describes the representation, interpretation, and structure of a data set stored in computer memory. A complex data type is a data type composed of a set of primitive data types such as, for example, integer numbers, Booleans, floating point numbers, and so on. A complex data type may be implemented as, for example, a vector, a matrix, a particular set of elements in a vector, a particular set of elements or rows or columns of a matrix, and so on. A complex data type is often specified in terms of the primitive data types of which it is composed. For example, a complex data type may specify each primitive data type included in the complex data type and the offset for each primitive data type. Consider, for further explanation, that the four elements of the data subset (648) in FIG. 6 each represent an integer number. The complex origin data type (622) describing the data subset (648) in the origin application storage (608) may be implemented as the following exemplary complex data type:

TABLE 1

EXEMPLARY COMPLEX DATA TYPE

| OFFSET | DATA TYPE |
|--------|-----------|
| 1 | Integer |
| 2 | Integer |
| 5 | Integer |
| 7 | Integer |

The exemplary complex data type above describes a data set in which two integers are stored adjacently in computer memory at offsets of 1 byte and 2 bytes, one integer is stored in computer memory at an offset of five bytes, and one integer is stored in computer memory at an offset of seven bytes. Readers will note that the exemplary complex data type above is for explanation and not for limitation.

Whereas primitive data types typically describe data that is stored contiguously in computer memory, complex data types may describe data that is stored contiguously or non-contiguously in computer memory. Consider the data (616) in FIG. 6. The entire set of the data (616) is stored contiguously in origin application storage (608), but the subset (648) of the data (616) is stored non-contiguously in the origin application storage (608) because the subset (648) of the data (616) is stored in three non-adjacent chunks in the origin application storage (608).

As mentioned above, the origin metadata (642) of FIG. 6 describes the complex origin data type (622). Metadata may describe a complex data type by specifying, for each contiguous chunk of data described by the complex data type, an offset describing a location of the contiguous chunk in computer memory and a length describing the size of the contiguous chunk. For further explanation, consider again, the exemplary complex data type in Table 1 above. Also consider that each of the four elements in the data subset (648) in FIG. 6 represent a one-byte integer number. The origin metadata (642) describing the complex origin data type (622) may be implemented as the following exemplary metadata:

TABLE 2

EXEMPLARY METADATA

| OFFSET | LENGTH |
|---|---|
| 1 | 2 |
| 5 | 1 |
| 7 | 1 |

The exemplary metadata in Table 2 above describes the exemplary complex data type in Table 1. The exemplary metadata in Table 2 above specifies that two bytes of data exists at an offset of one byte, one byte of data exists at an offset of five bytes, and one byte of data exists at an offset of seven bytes. Readers will note that the exemplary metadata above is for explanation and not for limitation. Readers will also note that such metadata may used by nodes for storing or retrieving data in computer memory without actually having to recognize or interpret the complex data type on which the metadata is based. For example, when a node attempts to access computer memory according to the exemplary complex data type in Table 1, such a node must also recognize that the primitive integer data type used in the exemplary complex data type is a one-byte integer, as opposed to a two-byte or four-byte integer. Because the exemplary metadata in Table 1 does not refer to any primitive data types such as, integer, floating point, and so on, the exemplary metadata may be used by any node to retrieve or store the data subset regardless of whether the node recognizes the primitive data types on which the metadata is based.

As mentioned above, the messaging module (160) of FIG. 6 receives both a complex origin data type and a complex target data type. In some embodiments of minimally buffered data transfers between nodes in a data communications network, the complex target data type is the same as the complex origin data type. In such embodiments, the origin messaging module (160) may transmit, to the target messaging module (612) on the target node (604), the selected subset (648) of the data for storing in the target application storage (614) in dependence upon the complex target data type (624) without buffering the subset (648) of the data (616) in a temporary buffer on the target node (604) by contiguously storing the selected subset (648) of the data (616) in a temporary buffer (646) on the origin node (600) and transmitting, from the temporary buffer (646) on the origin node (600) in a single data transfer operation, the subset (648) of the data (616) along with the origin metadata (642) describing the complex origin data type (622). In this manner, the target node (600) may store the subset (648) of the data (616) in the target application storage (614) without having to recognize the complex origin target data type (622).

In some embodiments where the complex target data type (624) is not the same as the complex origin data type (622), the origin messaging module (160) may create target metadata (644) describing the complex target data type (624). The origin messaging module (160) may then transmit, to the target messaging module (612) on the target node (604), the selected subset (648) of the data for storing in the target application storage (614) in dependence upon the complex target data type (624) without buffering the subset (648) of the data (616) in a temporary buffer on the target node (604) by contiguously storing the selected subset (648) of the data (616) in a temporary buffer (646) on the origin node (600), and transmitting, from the temporary buffer (646) on the origin node (600) in multiple data transfer operations, the selected subset (648) of the data (616) according to the target metadata (644).

In other embodiments where the complex target data type (624) is not the same as the complex origin data type (622), the origin messaging module (160) may transmit, to the target messaging module (612) on the target node (604), the selected subset (648) of the data for storing in the target application storage (614) in dependence upon the complex target data type (624) without buffering the subset (648) of the data (616) in a temporary buffer on the target node (604) by transmitting, directly from the origin application storage (608) in multiple data transfer operations, the selected subset (648) of the data (616) according to both the origin metadata (642) and the target metadata (644).

Figure 7:
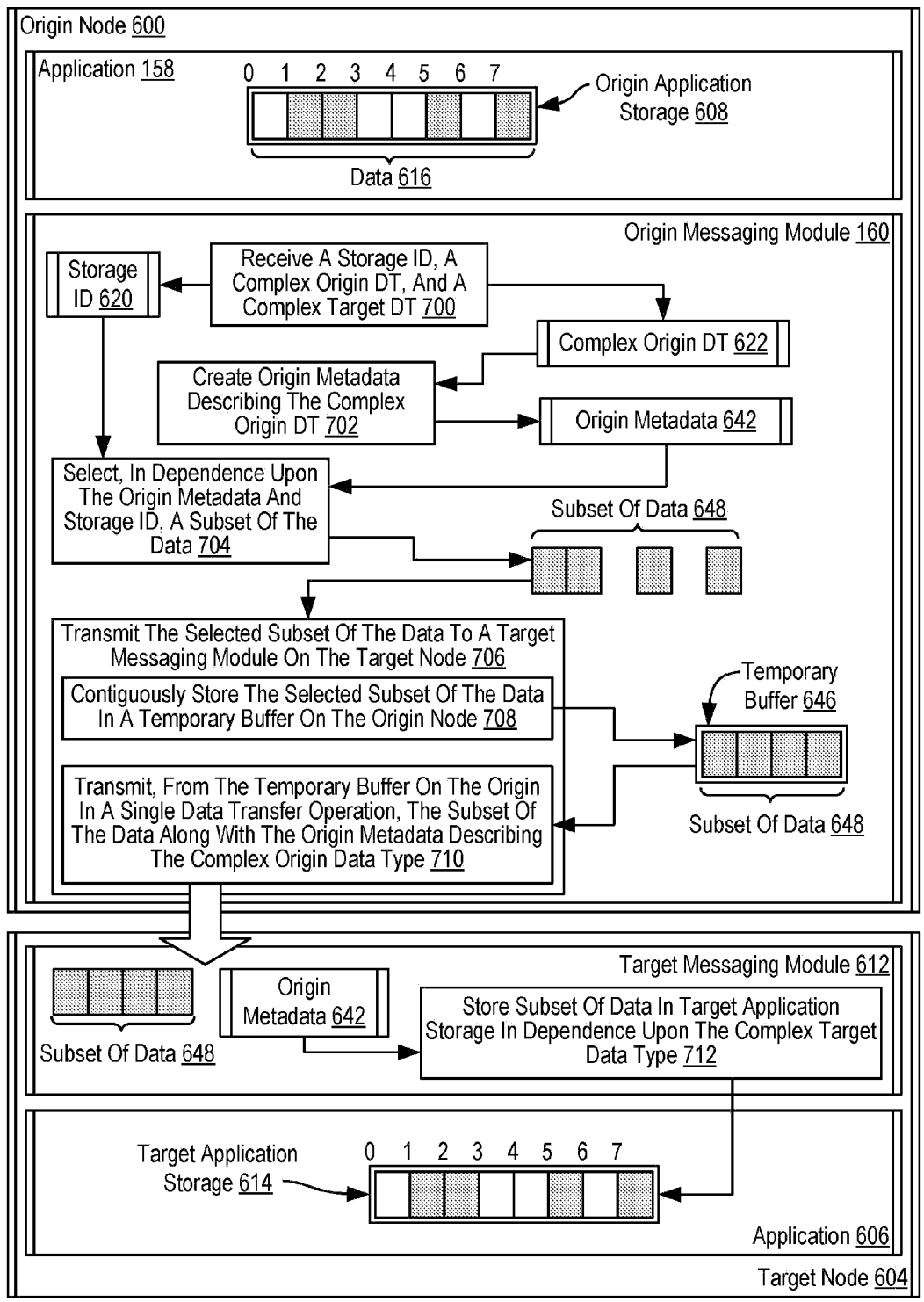
FIG. 7 sets forth a flow chart illustrating an exemplary method for minimally buffered data transfers between nodes in a data communications network according to embodiments of the present invention.

For further explanation, FIG. 7 sets forth a flow chart illustrating an exemplary method for minimally buffered data transfers between nodes in a data communications network according to embodiments of the present invention. The method of FIG. 7 includes receiving (700), by an origin messaging module (160) on an origin node (600) from an application (158) on the origin node (600), a storage identifier (620), a complex origin data type (622), and a complex target data type. The origin messaging module (160) may receive (700) a storage identifier (620), a complex origin data type (622), and a complex target data type from the application (158) according to the method of FIG. 7 as parameters to a call made by the application (158) to a function of an application programming interface ('API') exposed by the messaging module (160).

The storage identifier (620) of FIG. 7 specifies origin application storage (608) containing data (616) on the origin node (600). The origin application storage (608) represents computer memory on the origin node (600) allocated to the application (158) for use in data processing. In the example of FIG. 7, the data (616) contained in the origin application storage (608) illustrated as eight blocks, each block representing a chunk of the data (616).

In the example of FIG. 7, the complex origin data type (622) describes a subset (648) of the data (616) contained in the origin application storage (608). The subset (648) of the data (616) is illustrated in FIG. 7 as a set of grey blocks. As mentioned above, a data type describes the representation, interpretation, and structure of a data set stored in computer memory. A complex data type is a data type composed of a set of primitive data types such as, for example, integer numbers, Booleans, floating point numbers, and so on. A complex data type may be implemented as, for example, a vector, a matrix, a particular set of elements in a vector, a particular set of elements or rows or columns of a matrix, and so on. A complex data type is often specified in terms of the primitive data types of which it is composed. For example, a complex data type may specify each primitive data type included in the complex data type and the offset for each primitive data type as illustrated in exemplary Table 1 above.

A complex target data type (not shown) describes an arrangement of the subset (648) of the data (616) in target application storage (614) on a target node (604). Readers will note that the complex target data type is omitted from FIG. 7 because, in the example of FIG. 7, the complex target data type is the same as the complex origin data type (622). That is, the complex target data type specifies arranging the data subset (648) in target application storage (614) in the same manner as the complex origin data type specifies the arrangement of the data subset (648) in the origin application storage (608).

The method of FIG. 7 also includes creating (702), by the origin messaging module (160), origin metadata (642) describing the complex origin data type (622). As mentioned above, metadata may describe a complex data type by specifying, for each contiguous chunk of data described by the complex data type, an offset describing a location of the contiguous chunk in computer memory and a length describing the size of the contiguous chunk. The origin messaging module (160) may create (702) origin metadata (642) describing the complex origin data type (622) according to the method of FIG. 7 by identifying the offset and length of each chunk of adjacent primitive data types described by the complex origin data type (622) and storing the offset and length in a table. Consider, for example, that the exemplary complex origin data type in Table 1 above describes the data subset (648) in FIG. 7. Such an exemplary complex origin data type specifies three chunks of adjacent primitive data types. The first chunk has an offset of one byte from the beginning of origin application storage (608) and has a length of two bytes, one byte for each adjacent integer. The second chunk has an offset of five bytes from the beginning of origin application storage (608) and has a length of one byte. The third chunk has an offset of seven bytes from the beginning of origin application storage (608) and has a length of one byte. The result of identifying the offset and length of each chunk of adjacent primitive data types described by the exemplary complex origin data type in Table 1 and storing the offset and length in a table are illustrated in Table 2 above.

The method of FIG. 7 includes selecting (704), by the origin messaging module (160) from the origin application storage (608) in dependence upon the origin metadata (642) and the storage identifier (620), the subset (648) of the data (616) for transmission to the target node (604). The origin messaging module (160) may select (704) the data subset (648) from the origin application storage (608) according to the method of FIG. 7 by identifying beginning of the origin application storage (608) using the storage identifier (620) and locating the data subset (648) using the offsets and lengths specified in the origin metadata.

The method of FIG. 7 also includes transmitting (706), by the origin messaging module (160) to a target messaging module (612) on the target node (604), the selected subset (648) of the data (616) for storing in the target application storage (608) in dependence upon the complex target data type (622) without buffering the subset (648) of the data (616) in a temporary buffer (646) on the target node (604). The origin messaging module (160) may transmit (706) the selected subset (648) of the data (616) for storing in the target application storage (608) according to the method of FIG. 7 by contiguously storing (708) the selected subset (648) of the data (616) in a temporary buffer (646) on the origin node (600) and transmitting (710), from the temporary buffer (646) on the origin node (600) in a single data transfer operation, the subset (648) of the data (616) along with the origin metadata (642) describing the complex origin data type (622). Transmitting (710) the subset (648) of the data (616) along with the origin metadata (642) describing the complex origin data type (622) according to the method of FIG. 7 may be carried out by pre-pending the origin metadata (642) to the contiguous data subset (648), packetizing the metadata (642) and the data subset (648), and injecting the packets into the network for transmission to the target node (604). Readers will note that the origin metadata need only be transmitted to the target node (604) once in environments where the data subset (648) is repeatedly transmitted to the target node (604). The target node (604) may then cache the origin metadata for using in storing the data subset (648) received in subsequent data transfers.

The method of FIG. 7 also includes storing (712), by the target messaging module (612), the data subset (648) in target application storage (614) in dependence upon the complex target data type, which in the example of FIG. 7 is the same as the complex origin data type (622). The target messaging module (612) may store (712) the data subset (648) in target application storage (614) according to the method of FIG. 7 by storing the data subset (648) in the target application storage (614) directly from the network packets received from the origin node (600) using the offsets and lengths specified in the origin metadata (642). In such a manner, the target node (604) is able to reconstitute the data subset (648) in the target application storage (614) in the same arrangement as the data subset (648) was arranged in the origin application storage (608) without the target messaging module (612) having to recognize the complex origin data type (622) or temporarily store the data subset (648) in a temporary buffer on the target node (604).

The description above with reference to FIG. 7 explains minimally buffered data transfers between nodes in a data communications network according to embodiments of the present invention in which the complex target data type and the complex origin data type are the same. Readers will note, however, that in other embodiments the complex target data type and the complex origin data type are not the same. For further explanation, FIG. 8 sets forth a flow chart illustrating a further exemplary method for minimally buffered data transfers between nodes in a data communications network according to embodiments of the present invention.

Figure 8:
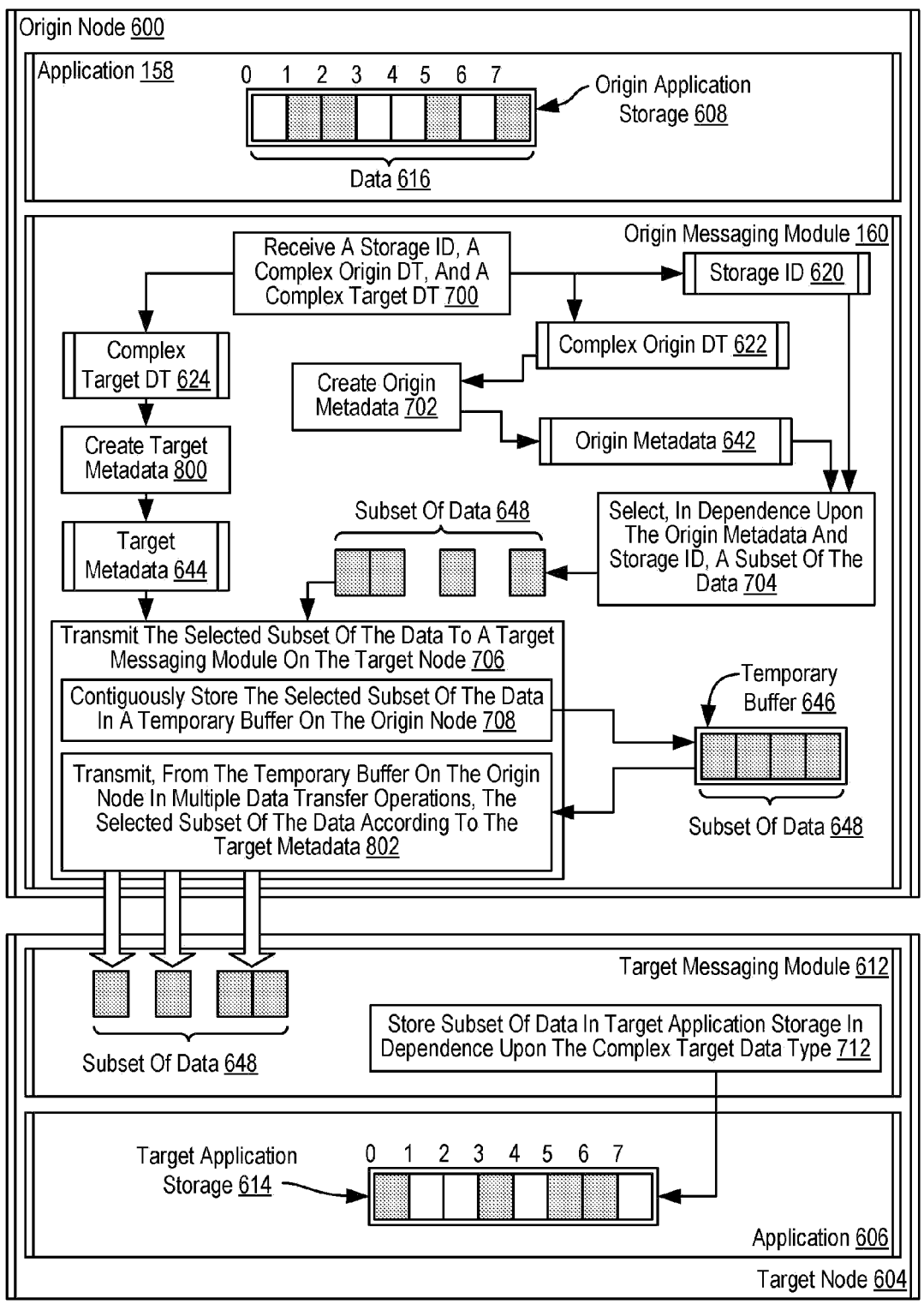
FIG. 8 sets forth a flow chart illustrating a further exemplary method for minimally buffered data transfers between nodes in a data communications network according to embodiments of the present invention.

The method of FIG. 8 is similar to the method of FIG. 7. That is, the method of FIG. 8 includes receiving (700), by an origin messaging module (160) on an origin node (600) from an application (158) on the origin node (600), a storage identifier (620), a complex origin data type (622), and a complex target data type (624), the storage identifier (620) specifying origin application storage (608) containing data (616) on the origin node (600), the complex origin data type (622) describing a subset (648) of the data (616) contained in the origin application storage (608), the complex target data type (624) describing an arrangement of the subset (648) of the data (616) in target application storage (614) on a target node (604); creating (702), by the origin messaging module (160), origin metadata (642) describing the complex origin data type (622); selecting (704), by the origin messaging module (160) from the origin application storage (608) in dependence upon the origin metadata (642) and the storage identifier (620), the subset (648) of the data (616) for transmission to the target node (604); and transmitting (706), by the origin messaging module (160) to a target messaging module (612) on the target node (604), the selected subset (648) of the data (616) for storing in the target application storage (608) in dependence upon the complex target data type (622) without buffering the subset (648) of the data (616) in a temporary buffer (646) on the target node (604).

The method of FIG. 8 differs from the method of FIG. 7 in that the method of FIG. 8 includes creating (800), by the origin messaging module (160), target metadata (644)

describing the complex target data type (624). The origin messaging module (160) may create (800) the target metadata (644) describing the complex target data type (624) according to the method of FIG. 8 by identifying the offset and length of each chunk of adjacent primitive data types described by the complex target data type (624) and storing the offset and length in a table. For example, consider the following exemplary complex data type that describes the arrangement of the data subset (648) in the target application storage (614):

TABLE 3

EXEMPLARY COMPLEX DATA TYPE

| OFFSET | DATA TYPE |
|--------|-----------|
| 0 | Integer |
| 3 | Integer |
| 5 | Integer |
| 6 | Integer |

The exemplary complex data type above describes a data set in which an integer is stored at an offset of 0 bytes from the beginning of the target application storage (614), an integer is stored at an offset of 3 bytes from the beginning of the target application storage (614), and two integers are stored at offsets of 5 bytes and 6 bytes from the beginning of the target application storage (614).

Identifying the offset and length of each chunk of adjacent primitive data types described by the exemplary complex target data type illustrated in Table 3 and storing the offset and length in a table may yield the following exemplary target metadata:

TABLE 4

EXEMPLARY METADATA

| OFFSET | LENGTH |
|--------|--------|
| 0 | 1 |
| 3 | 1 |
| 5 | 2 |

The exemplary metadata in Table 4 above describes the exemplary complex data type in Table 3. The exemplary metadata in Table 4 above specifies that one byte of data exists at an offset of zero bytes, one byte of data exists at an offset of three bytes, and two bytes of data exists at an offset of five bytes. Readers will note that the exemplary complex target data type and exemplary target metadata above are for explanation and not for limitation.

In the method of FIG. 8, the origin messaging module (160) may transmit (706) the selected subset (648) of the data (616) for storing in the target application storage (608) by contiguously storing (708) the selected subset (648) of the data (616) in a temporary buffer (646) on the origin node (600) and transmitting (802), from the temporary buffer (646) on the origin node (600) in multiple data transfer operations, the selected subset (648) of the data (616) according to the target metadata (644). Transmitting (802), from the temporary buffer (646) on the origin node (600) in multiple data transfer operations, the selected subset (648) of the data (616) according to the target metadata (644) according to the method of FIG. 8 may be carried out by selecting, for each contiguous chunk of data specified in the target metadata (644), a portion of the data subset (648) having a length that matches the length specified in the target metadata (644), packetizing the selected portion, and injecting the packets into a network for transmission to the target node (604). For further explanation, consider again the exemplary target metadata in Table 4 above. Because the first chunk of data specified in the exemplary target metadata has a length of one byte, one byte of the data subset (648) in the temporary buffer (646) is transmitted to the target node (604) in a first data transfer operation. Because the second chunk of data specified in the exemplary target metadata has a length of one byte, one byte of the data subset (648) in the temporary buffer (646) is transmitted to the target node (604) in a second data transfer operation. Because the third chunk of data specified in the exemplary target metadata has a length of two bytes, the last two bytes of the data subset (648) in the temporary buffer (646) is transmitted to the target node (604) in a third data transfer operation.

The method of FIG. 8 also includes storing (712), by the target messaging module (612), the data subset (648) in target application storage (614) in dependence upon the complex target data type (624). The target messaging module (612) may store (712) the data subset (648) in target application storage (614) in dependence upon the complex target data type (624) according to the method of FIG. 8 by storing the data subset (648) in the target application storage (614) directly from the network packets received from the origin node (600). Each chunk of the data subset (648) partitioned according to the target metadata (644), which in turn is created from the complex target data type (624), specifies the memory location on target node (604) where the target node (604) should store that particular chunk of the data subset (648). In such a manner, the target node (604) is able to reconstitute the data subset (648) in the target application storage (614) in arrangement recognizable to the target application (606) without the target messaging module (612) having to store the data subset (648) in a temporary buffer on the target node (604).

In some embodiments of minimally buffered data transfers between nodes in a data communications network, the messaging module (160) may combine both the origin metadata and the target metadata for use in transmitting the data subset to the target node. For further explanation, FIG. 9 sets forth a flow chart illustrating a further exemplary method for minimally buffered data transfers between nodes in a data communications network according to the present invention.

Figure 9:
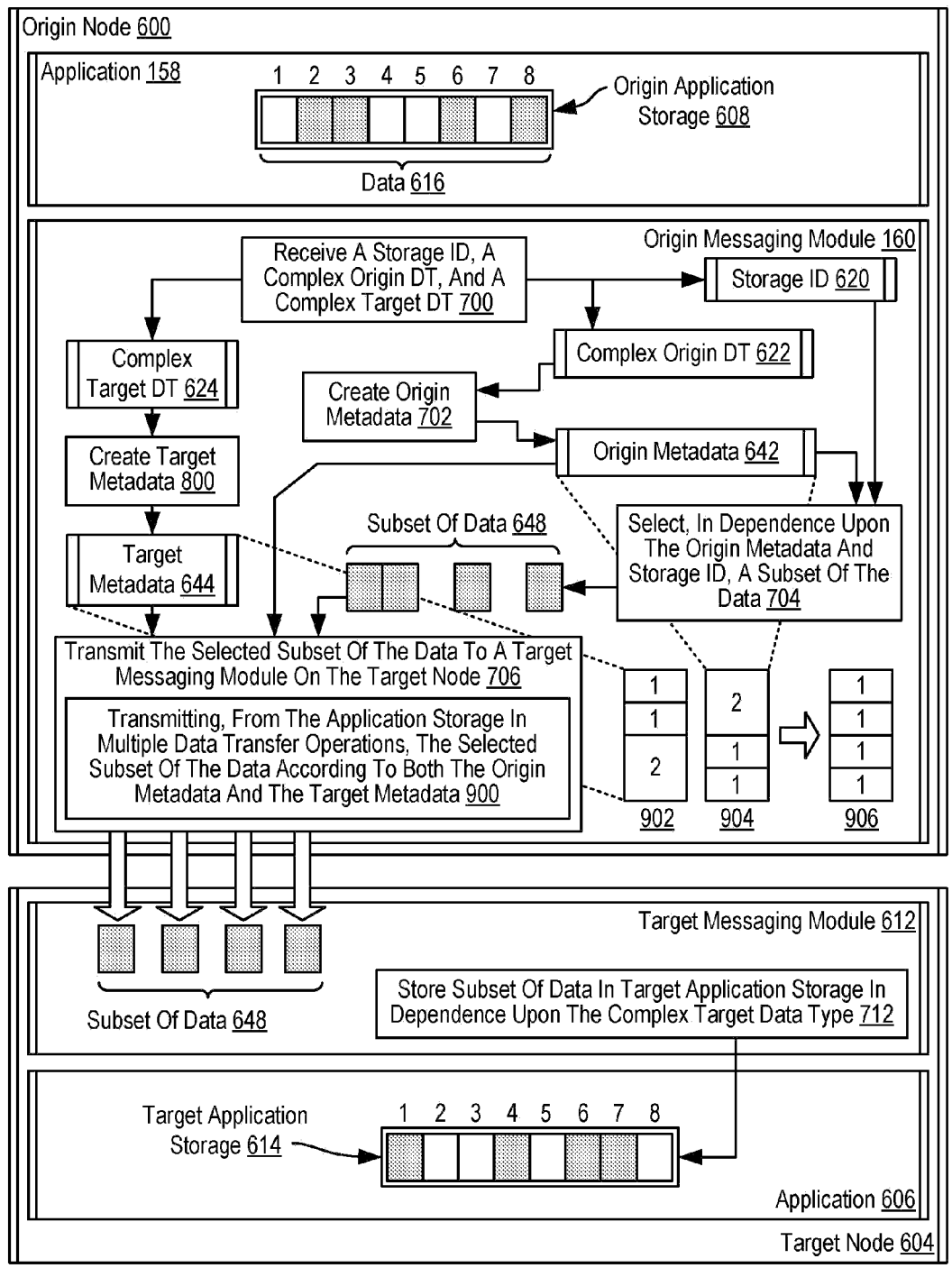
FIG. 9 sets forth a flow chart illustrating a further exemplary method for minimally buffered data transfers between nodes in a data communications network according to embodiments of the present invention.

The method of FIG. 9 is similar to the method of FIG. 8. That is, the method of FIG. 9 includes receiving (700), by an origin messaging module (160) on an origin node (600) from an application (158) on the origin node (600), a storage identifier (620), a complex origin data type (622), and a complex target data type (624), the storage identifier (620) specifying origin application storage (608) containing data (616) on the origin node (600), the complex origin data type (622) describing a subset (648) of the data (616) contained in the origin application storage (608), the complex target data type (624) describing an arrangement of the subset (648) of the data (616) in target application storage (614) on a target node (604); creating (702), by the origin messaging module (160), origin metadata (642) describing the complex origin data type (622); creating (800), by the origin messaging module (160), target metadata (644) describing the complex target data type (624); selecting (704), by the origin messaging module (160) from the origin application storage (608) in dependence upon the origin metadata (642) and the storage identifier (620), the subset (648) of the data (616) for transmission to the target node (604); and transmitting (706), by the origin messaging module (160) to a target messaging module (612) on the target node (604), the selected subset (648) of the data (616) for storing in the target application storage (608) in dependence upon the complex target data type (622) without buffering the subset (648) of the data (616) in a temporary buffer (646) on the target node (604).

In the method of FIG. 9, the origin messaging module (160) may transmit (706) the selected subset (648) of the data (616) for storing in the target application storage (608) by transmitting (900), from the origin application storage (608) in multiple data transfer operations, the selected subset (648) of the data (616) according to both the origin metadata (642) and the target metadata (644). Transmitting (900), from the origin application storage (608) in multiple data transfer operations, the selected subset (648) of the data (616) according to both the origin metadata (642) and the target metadata (644) according to the method of FIG. 9 may be carried out by selecting, for each common contiguous chunks of data specified in both the origin metadata (642) and the target metadata (644), a portion of the data subset (648) having a length that matches the length of the common contiguous chunk, packetizing the selected portion, and injecting the packets into a network for transmission to the target node (604).

For further explanation of the common continuous chunks of data specified in both the origin metadata (642) and the target metadata (644), FIG. 9 illustrates a graphical representation (902) of the target metadata (644) and a graphical representation (904) of the origin metadata (642). The graphical representations (902, 904) are based on the exemplary origin metadata and the exemplary target metadata in Tables 2 and 4, respectively. The graphical representation (902) of the target metadata (644) illustrates a first contiguous chuck of one byte, a second contiguous chunk of one byte, and a third contiguous chunk of two bytes. The graphical representation (904) of the origin metadata (642) illustrates a first contiguous chuck of two bytes, a second contiguous chunk of one byte, and a third contiguous chunk of one byte. The graphical representation (906) depicts the common contiguous chunks of data specified in both the origin metadata (642) and the target metadata (644). The graphical representation (906) illustrates a first common contiguous chunk of one byte, a second common contiguous chunk of one byte, a third common contiguous chunk of one byte, and a fourth common contiguous chunk of one byte.

In the example of FIG. 9, because the first common contiguous chunk of data specified in both the exemplary target metadata and exemplary origin metadata has a length of one byte, one byte of the data subset (648) in the temporary buffer (646) is transmitted to the target node (604) in a first data transfer operation. Because the second common contiguous chunk of data specified in both the exemplary target metadata and exemplary origin metadata has a length of one byte, the next one byte of the data subset (648) in the temporary buffer (646) is transmitted to the target node (604) in a second data transfer operation. Because the third common contiguous chunk of data specified in both the exemplary target metadata and exemplary origin metadata has a length of one byte, the next one byte of the data subset (648) in the temporary buffer (646) is transmitted to the target node (604) in a third data transfer operation. Because the fourth common contiguous chunk of data specified in both the exemplary target metadata and exemplary origin metadata has a length of one byte, the next one byte of the data subset (648) in the temporary buffer (646) is transmitted to the target node (604) in a fourth data transfer operation.

The method of FIG. 9 also includes storing (712), by the target messaging module (612), the data subset (648) in target application storage (614) in dependence upon the complex target data type (624). The target messaging module (612) may store (712) the data subset (648) in target application storage (614) in dependence upon the complex target data type (624) according to the method of FIG. 9 by storing the data subset (648) in the target application storage (614) directly from the network packets received from the origin node (600). Each chunk of the data subset (648) partitioned according to the target metadata (644), which in turn is created from the complex target data type (624), specifies the memory location on target node (604) where the target node (604) should store that particular chunk of the data subset (648). In such a manner, the target node (604) is able to reconstitute the data subset (648) in the target application storage (614) in arrangement recognizable to the target application (606) without the target messaging module (612) having to store the data subset (648) in a temporary buffer on the target node (604).

Exemplary embodiments of the present invention are described largely in the context of a fully functional computer system for minimally buffered data transfers between nodes in a data communications network. Readers of skill in the art will recognize, however, that the present invention also may be embodied in a computer program product disposed on computer readable media for use with any suitable data processing system. Such computer readable media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web as well as wireless transmission media such as, for example, networks implemented according to the IEEE 802.11 family of specifications. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method for minimally buffered data transfers between nodes in a data communications network, the method comprising:

receiving, by an origin messaging module on an origin node from an application on the origin node, a storage identifier, a complex origin data type, and a complex target data type, the storage identifier specifying origin application storage containing data on the origin node, the complex origin data type describing a subset of the data contained in the origin application storage, the complex target data type describing an arrangement of the subset of the data in target application storage on a target node;

creating, by the origin messaging module, origin metadata describing the complex origin data type;

selecting, by the origin messaging module from the origin application storage in dependence upon the origin metadata and the storage identifier, the subset of the data for transmission to the target node; and transmitting, by the origin messaging module to a target messaging module on the target node, the selected subset of the data for storing in the target application storage in dependence upon the complex target data type without any type of buffering the subset of the data in a temporary buffer on the target node.

2. The method of claim 1 wherein:

the complex target data type is the same as the complex origin data type; and transmitting, by the origin messaging module to a target messaging module on the target node, the selected subset of the data for storing in the target application storage in dependence upon the complex target data type without buffering the subset of the data in a temporary buffer on the target node further comprises:

contiguously storing the selected subset of the data in a temporary buffer on the origin node; and transmitting, from the temporary buffer on the origin node in a single data transfer operation, the subset of the data along with the origin metadata describing the complex origin data type.

3. The method of claim 1 wherein:

the method further comprises creating, by the origin messaging module, target metadata describing the complex target data type; and transmitting, by the origin messaging module to a target messaging module on the target node, the selected subset of the data for storing in the target application storage in dependence upon the complex target data type without buffering the subset of the data in a temporary buffer on the target node further comprises:

contiguously storing the selected subset of the data in a temporary buffer on the origin node, and transmitting, from the temporary buffer on the origin node in multiple data transfer operations, the selected subset of the data according to the target metadata.

4. The method of claim 1 wherein:

the method further comprises creating, by the origin messaging module, target metadata describing the complex target data type; and transmitting, by the origin messaging module to a target messaging module on the target node, the selected subset of the data for storing in the target application storage in dependence upon the complex target data type without buffering the subset of the data in a temporary buffer on the target node further comprises transmitting, from the origin application storage in multiple data transfer operations, the selected subset of the data according to both the origin metadata and the target metadata.

5. The method of claim 1 wherein the origin metadata specifies, for each contiguous chunk of data described by the complex origin data type, an offset describing a location of the contiguous chunk in the origin application storage and a length describing the size of the contiguous chunk.

6. The method of claim 1 wherein the origin compute node and the target compute node are comprised in a parallel computer, the parallel computer comprising a plurality of compute nodes connected for data communications through a plurality of data communications networks, at least one of the plurality of data communications networks optimized for point to point data communications, and at least one of the plurality of data communications networks optimized for collective operations.

7. An apparatus for minimally buffered data transfers between nodes in a data communications network, the apparatus comprising a computer processor and computer memory operatively coupled to the computer processor, the computer memory having disposed within it computer program instructions capable of:

receiving, by an origin messaging module on an origin node from an application on the origin node, a storage identifier, a complex origin data type, and a complex target data type, the storage identifier specifying origin application storage containing data on the origin node, the complex origin data type describing a subset of the data contained in the origin application storage, the complex target data type describing an arrangement of the subset of the data in target application storage on a target node;

creating, by the origin messaging module, origin metadata describing the complex origin data type;

selecting, by the origin messaging module from the origin application storage in dependence upon the origin metadata and the storage identifier, the subset of the data for transmission to the target node; and transmitting, by the origin messaging module to a target messaging module on the target node, the selected subset of the data for storing in the target application storage in dependence upon the complex target data type without any type of buffering the subset of the data in a temporary buffer on the target node.

8. The apparatus of claim 7 wherein:

the complex target data type is the same as the complex origin data type; and transmitting, by the origin messaging module to a target messaging module on the target node, the selected subset of the data for storing in the target application storage in dependence upon the complex target data type without buffering the subset of the data in a temporary buffer on the target node further comprises:

contiguously storing the selected subset of the data in a temporary buffer on the origin node; and transmitting, from the temporary buffer on the origin node in a single data transfer operation, the subset of the data along with the origin metadata describing the complex origin data type.

9. The apparatus of claim 7 wherein:

the computer memory has disposed within it computer program instructions capable of creating, by the origin messaging module, target metadata describing the complex target data type; and transmitting, by the origin messaging module to a target messaging module on the target node, the selected subset of the data for storing in the target application storage according to the target metadata to select the subset of data to be transmitted without buffering the subset of the data in a temporary buffer on the target node further comprises:

contiguously storing the selected subset of the data in a temporary buffer on the origin node, and transmitting, from the temporary buffer on the origin node in multiple data transfer operations, the selected subset of the data according to the target metadata.

10. The apparatus of claim 7 wherein:
the computer memory has disposed within it computer program instructions capable of creating, by the origin messaging module, target metadata describing the complex target data type; and
transmitting, by the origin messaging module to a target messaging module on the target node, the selected subset of the data for storing in the target application storage in dependence upon the complex target data type without buffering the subset of the data in a temporary buffer on the target node further comprises transmitting, from the origin application storage in multiple data transfer operations, the selected subset of the data according to both the origin metadata and the target metadata.

11. The apparatus of claim 7 wherein the origin metadata specifies, for each contiguous chunk of data described by the complex origin data type, an offset describing a location of the contiguous chunk in the origin application storage and a length describing the size of the contiguous chunk.

12. The apparatus of claim 7 wherein the origin compute node and the target compute node are comprised in a parallel computer, the parallel computer comprising a plurality of compute nodes connected for data communications through a plurality of data communications networks, at least one of the plurality of data communications networks optimized for point to point data communications, and at least one of the plurality of data communications networks optimized for collective operations.

13. A computer program product for minimally buffered data transfers between nodes in a data communications network, the computer program product disposed upon a computer readable, recordable medium, the computer program product comprising computer program instructions capable of:
receiving, by an origin messaging module on an origin node from an application on the origin node, a storage identifier, a complex origin data type, and a complex target data type, the storage identifier specifying origin application storage containing data on the origin node, the complex origin data type describing a subset of the data contained in the origin application storage, the complex target data type describing an arrangement of the subset of the data in target application storage on a target node;
creating, by the origin messaging module, origin metadata describing the complex origin data type;
selecting, by the origin messaging module from the origin application storage in dependence upon the origin metadata and the storage identifier, the subset of the data for transmission to the target node; and
transmitting, by the origin messaging module to a target messaging module on the target node, the selected subset of the data for storing in the target application storage in dependence upon the complex target data type without any type of buffering the subset of the data in a temporary buffer on the target node.

14. The computer program product of claim 13 wherein:
the complex target data type is the same as the complex origin data type; and
transmitting, by the origin messaging module to a target messaging module on the target node, the selected subset of the data for storing in the target application storage in dependence upon the complex target data type without buffering the subset of the data in a temporary buffer on the target node further comprises:
contiguously storing the selected subset of the data in a temporary buffer on the origin node; and
transmitting, from the temporary buffer on the origin node in a single data transfer operation, the subset of the data along with the origin metadata describing the complex origin data type.

15. The computer program product of claim 13 wherein:
the computer program product further comprises computer program instructions capable of creating, by the origin messaging module, target metadata describing the complex target data type; and
transmitting, by the origin messaging module to a target messaging module on the target node, the selected subset of the data for storing in the target application storage according to the target metadata without buffering the subset of the data in a temporary buffer on the target node further comprises:
contiguously storing the selected subset of the data in a temporary buffer on the origin node, and
transmitting, from the temporary buffer on the origin node in multiple data transfer operations, the selected subset of the data according to the target metadata.

16. The computer program product of claim 13 wherein:
the computer program product further comprises computer program instructions capable of creating, by the origin messaging module, target metadata describing the complex target data type; and
transmitting, by the origin messaging module to a target messaging module on the target node, the selected subset of the data for storing in the target application storage in dependence upon the complex target data type without buffering the subset of the data in a temporary buffer on the target node further comprises transmitting, from the origin application storage in multiple data transfer operations, the selected subset of the data according to both the origin metadata and the target metadata.

17. The computer program product of claim 13 wherein the origin metadata specifies, for each contiguous chunk of data described by the complex origin data type, an offset describing a location of the contiguous chunk in the origin application storage and a length describing the size of the contiguous chunk.

18. The computer program product of claim 13 wherein the origin compute node and the target compute node are comprised in a parallel computer, the parallel computer comprising a plurality of compute nodes connected for data communications through a plurality of data communications networks, at least one of the plurality of data communications networks optimized for point to point data communications, and at least one of the plurality of data communications networks optimized for collective operations.

* * * * *